United States Patent
Ogata et al.

(10) Patent No.: US 7,209,318 B2
(45) Date of Patent: Apr. 24, 2007

(54) BUFFERING MECHANISM AND RECORDING AND/OR REPRODUCING APPARATUS

(75) Inventors: Masanori Ogata, Saitama (JP); Kazuhito Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 10/767,333

(22) Filed: Jan. 30, 2004

(65) Prior Publication Data
US 2004/0184183 A1 Sep. 23, 2004

(30) Foreign Application Priority Data
Feb. 4, 2003 (JP) ............................. 2003-027164

(51) Int. Cl.
*G11B 17/02* (2006.01)

(52) U.S. Cl. .................................................. 360/97.01
(58) Field of Classification Search ..................... None
See application file for complete search history.

(56) References Cited

U.S. PATENT DOCUMENTS

| | | | | |
|---|---|---|---|---|
| 4,553,231 A | * | 11/1985 | d'Alayer de Costemore d'Arc | 720/651 |
| 5,379,990 A | * | 1/1995 | Ando et al. | 267/34 |
| 6,543,738 B2 | * | 4/2003 | Smith | 248/345.1 |

* cited by examiner

*Primary Examiner*—Robert S. Tupper
(74) *Attorney, Agent, or Firm*—Oblon, Spivak, McClelland, Maier & Neustadt, P.C.

(57) ABSTRACT

A buffering mechanism in which the contact area between an object to be housed and an elastic member interposed between the object to be housed and a housing member for housing the object is to be increased, while the elastic member is to have a sufficient thickness in at least two mutually perpendicular buffering directions. To this end, a buffering mechanism 10 is provided in which an object to be housed 12 is bufferably accommodated in a housing member 11. The object to be housed 12 includes at least three shaft units 13 extending in a direction substantially perpendicular to the direction of thickness of the object. An elastic member 14 is formed of an elastic material and provided with a cylindrically-shaped shaft accommodating opening 14a. The shaft unit is introduced into the shaft accommodating opening of the elastic member. At least a portion of the outer lateral surface of the elastic member is contacted with the housing member.

14 Claims, 18 Drawing Sheets

BUFFERING MECHANISM AND RECORDING AND/OR REPRODUCING APPARATUS

BACKGROUND OF THE INVENTION

1. Field of the Invention

This invention relates to a novel buffering mechanism and a recording and/or reproducing apparatus. More particularly, it relates to a technique for increasing the contact area between a housed material or object and an elastic member interposed between the housed material or object and a housing member housing the material or object.

2. Description of Related Art

Up to now, it has been practiced to get an elastic member interposed between a housing member and a material or object, housed within the housing member, in order that the material or object housed within the housing member will be buffered against large vibrations or impacts transmitted via the housing member.

Among the elastic members, so far used extensively, there is a silicon-based buffering material 102 shown in FIG. 4 of Japanese Laying-Open Patent Publication 2002-334571, refered to Patent Publication 1 hereinafter, having substantially a cylindrical outer shape, and provided with a slit at a mid portion along the axial direction. A typical example of use of this sort of the elastic member is shown in FIGS. 22 and 23.

An elastic member 1 is of a substantially cylindrical outer shape and has a center through-hole 1a for support and with a slit 1b in its entire outer peripheral surface at a mid portion along the axial direction.

A supporting plate 3 of an L-shaped lateral side shape is secured to the housed material 2. The rim of a cut-out 3a formed in the support plate 3 is engaged in the slit 1b of the elastic member 1, whereby the elastic member 1 is supported via the support plate 3 by the housed material 2. In this manner, three or more elastic members, usually four elastic members 1, 1, . . . as in the buffering mechanism of the Patent Publication 1, are mounted to the housed material 2.

A shaft unit 4a is secured to a housing member 4 adapted for housing the material 2. The shaft unit 4a is inserted in the center through-hole 1a of the elastic member. A set screw 4b is threadedly mounted to the distal end of the shaft unit 4a to prevent the elastic member 1 from being detached from the shaft unit 4a. In this manner, the material 2 is housed within the housing member 4 through the elastic member 1.

In the buffering mechanism, shown in FIGS. 22 and 23, the vibrations or impacts, transmitted from outside the housing member 4, are buffered by the elastic member 1 and transmitted in this state to the housed material 2.

However, since the slit 1b has been formed in the elastic member and the elastic member is mounted by this slit 1b to the support plate 3 via this slit 1b, the degree of buffering is differential, in dependence upon the direction of transmission of the vibrations or impacts.

More specifically, the vibrations or impacts, applied from the direction of an arrow A in FIG. 22, may be sufficiently buffered by a sufficient thickness Ta of the elastic member 1 between the support plate 3 and the housing member 4, however, the vibrations or impacts, applied from the direction of an arrow B in FIG. 22, are buffered by a small thickness Tb of the elastic member 1 between the recessed end of the slit 1b of the elastic member land the inner peripheral surface of the center hole 1a thereof, so that the buffering action is not optimum. For this reason, the buffering mechanism of the Patent Publication 1, employing an elastic member mounted by the slit, as the elastic member 1, that is, the buffer material 102, has to use a two-step structure in which a storage device 10 as a housed material is first mounted to a metal fixture for mounting 12 via the buffer material 102 and in which the metal fixture for mounting 12 is mounted via a separate buffer material 101 to a metal fixture for external mounting 13 equivalent to the housing member 4.

With the cylindrically-shaped elastic member, having the slit in its outer peripheral surface, and supported relative to the housed material via this slit, the buffering action is directive, such that a marked difference in the buffering action is caused between the that acting in the axial direction of the cylindrical shape and that acting in the direction perpendicular thereto. Thus, if the similar degree of the buffering action is desirable for the direction indicated by arrow A and for the direction indicated by arrow B in FIG. 22, the structure for buffering is necessarily complicated, such as that shown in the Patent Publication 1, thus raising the cost. In addition, the buffering mechanism itself is large-sized due to the dual support structure for the material and to the presence of the different sort of the buffering material, with the consequence that the strong demand for a smaller size of the equipment cannot be met.

A buffering mechanism, shown in the patent publication 2, has also been proposed, in which a sufficient buffering action may be provided in two mutually perpendicular directions, such as the directions A and B in FIG. 22, with the use of a sole sort of the buffering material, without resorting to a dual structure.

That is, plural buffer structures (elastic members) 10a to 10d of an elastic material, in the form of collapsed sphere, are mounted at four inner corners of a material or object to be protected (object 12). The object 12 is housed within the housing member 14 so that the buffer structures 10a to 10d contact the housing member 14 at four inner corners (see FIGS. 1 to 3 of Japanese Laying-Open Patent Publication H11-37198, refered to Patent Publication 2 hereinafter). In this manner, the buffering structures 10a to 10d may perform satisfactory buffering actions in the mutually perpendicular directions of arrows C and D in FIG. 24, with the result that the object for protection 12 may be optimally buffered against the vibrations and impacts transmitted via the housing member 14.

Meanwhile, in the buffering mechanism, shown in the Patent Publication 2, the lateral surface sides of the buffer structures 10a to 10d are provided with cutouts 5, and the four corners of the object for protection 12 are fitted in these cut-outs 5, in order to mount the buffer structures 10a to 10d to the object for protection 12. Thus, the vibrations and impacts along the direction C are buffered mainly by the portion of each buffering structure 10a to 10d from the lower surface of the object for protection 12 to the lower end of the buffer structure 10a to 10d, that is, a thickness Tc. On the other hand, the vibrations and impacts along the direction D are buffered mainly by the portion of each buffering structure 10a to 10d from the lateral surface of the object for protection 12 to the outer lateral surface of each buffer structure, 10a to 10d, that is, a thickness Td.

As may be seen from FIGS. 2 and 3 of the Patent Publication 2 and from FIG. 24 hereof, Tc<Td. In this case, a problem is raised that the weight mass of the buffer structures 10a to 10d, carrying the weight of the object for protection 12 on application of vibrations or impacts, is evidently smaller than the vibrations or impacts acting in the direction of the arrow C. In particular, if the object for protection 12 is a hard disc drive, it is crucial that a head is able to buffer the vibrations or impacts efficaciously in the direction of the arrow C which is the direction in which the head is moved towards or away from the disc. If, in the structure of the Patent Publication 2, the effective thickness (Tc as aforementioned) of the buffer structures 10*a* to 10*d*, in the direction of the arrow C, is to be increased, the size of the buffer structures 10*a* to 10*d* in the direction of the arrow C, has to be increased, because the thickness of the hard disc drive cannot be reduced, thus increasing the thickness of the entire apparatus inclusive of the housing member 14.

Moreover, the buffer structures 10*a* to 10*d* are severely deformed in performing the buffering action. For example, in buffering the vibrations or impacts in the direction of the arrow C, a portion 6 of each buffer structure 10*a* to 10*d* lying directly below the object for protection 12 (shown netted in FIG. 24) is appreciably deformed, while the other portion, in particular the portion between the lateral surface of the object for protection 12 and the lateral surface of the housing member 14, is not likely to be deformed, so that the buffer structures 10*a* to 10*d* are severely deformed in shape. Thus, if simply the corners of the object for protection 12 are fitted in the cutouts 3*a* of the buffer structures 10*a* to 10*d*, the buffer structures 10*a* to 10*d* are highly likely to be detached from the object for protection 12. Although the buffer structures 10*a* to 10*d* and the object for protection 12 may be bonded together, the bonding step leads to onerous problems, such as storage and management of an adhesive or the management of the bonding step itself. Moreover, the bonding performance is degraded with lapse of time, while the buffer structures 10*a* to 10*d* are subjected to repeated deformation. In addition, there still persists the risk of the buffer structures 10*a* to 10*d* becoming detached from the object for protection 12.

SUMMARY OF THE INVENTION

It is therefore an object of the present invention to provide a buffering mechanism in which the contact area between a material or object to be housed and an elastic member interposed between the material or object and a housing member therefor may be increased and in which the elastic member has a sufficient thickness in the two mutually perpendicular buffering directions.

In one aspect, the present invention provides a buffering mechanism comprising a housing member for housing an object, at least three shaft units mounted to the object and extending in a direction substantially perpendicular to the direction of thickness of the object, and an elastic member formed of an elastic material and provided with a shaft accommodating opening. The shaft unit is introduced into the shaft accommodating opening of the elastic member. At least a portion of the outer lateral surface of the elastic member is contacted with the housing member.

Thus, in the buffering mechanism of the present invention, in which the shaft unit provided to the object to be housed is introduced into the cylindrically-shaped shaft accommodating opening in the elastic member, a sufficient contact area is provided between the object to be housed and the elastic member. A sufficient thickness of the elastic member is also provided in a direction along the axis of the shaft accommodating opening and in a direction perpendicular to this direction.

In another aspect, the present invention provides a recording and/or reproducing apparatus comprising a housing member for housing a recording medium, a recording and/or reproducing unit for recording and/or reproducing the information for the recording medium, at least three shaft units mounted to a container containing the recording medium and extending in a direction substantially perpendicular to the direction of thickness of the recording medium, and an elastic member formed of an elastic material and provided with a shaft accommodating opening. The shaft unit is introduced into the shaft accommodating opening of the elastic member. At least a portion of the outer lateral surface of the elastic member is contacted with the housing member.

Thus, in the recording and/or reproducing apparatus of the present invention, in which the shaft unit mounted to the container containing to the recording medium is introduced into the cylindrically-shaped shaft accommodating opening in the elastic member, a sufficient contact area is provided between the recording medium container and the elastic member. A sufficient thickness of the elastic member is provided in a direction along the axis of the shaft accommodating opening and in a direction perpendicular to this direction.

With the buffering mechanism in which an object to be housed is bufferably accommodated in a housing member, according to the present invention, the object to be housed includes at least three shaft units extending in a direction substantially perpendicular to the direction of thickness of the object. An elastic member formed of an elastic material is provided with a cylindrically-shaped shaft accommodating opening, into which is introduced the shaft unit. At least a portion of the outer lateral surface of the elastic member is contacted with the housing member.

Thus, in the buffering mechanism of the present invention, in which the shaft unit provided to the object to be housed is inserted in the cylindrically-shaped shaft accommodating opening of the elastic member, a sufficient contact area is provided between the object and the elastic member. A sufficient thickness of the elastic member may be achieved both in the axial direction of the shaft accommodating opening and in a direction perpendicular to this axial direction, so that a necessary and sufficient buffering action may be performed to reliably protect the object against damages or malfunctions.

In another exemplary embodiment, in which the object contains a recording medium, which is vulnerable against vibrations or impacts, may be protected reliably against the vibrations or impacts.

With the recording and/or reproducing apparatus, including a recording medium and a recording and/or reproducing unit for recording and/or reproducing the information for the recording medium, according to the present invention, the recording medium container includes at least three shaft units extending in a direction substantially perpendicular to the direction of thickness of the recording medium. An elastic member formed of an elastic material is provided with a cylindrically-shaped shaft accommodating opening, into which is introduced the shaft unit. At least a portion of the outer lateral surface of the elastic member is contacted with the housing member.

Thus, in the recording and/or reproducing apparatus of the present invention, in which the shaft unit mounted to the container containing to the recording medium is inserted in the cylindrically-shaped shaft accommodating opening of the elastic member, a sufficient contact area is provided between the recording medium container and the elastic member. A sufficient thickness of the elastic member may be achieved both in the axial direction of the shaft accommodating opening and in a direction perpendicular to this axial direction, so that a necessary and sufficient buffering action may be achieved to reliably protect the recording medium against damages or malfunctions.

In yet another embodiment, the housing member is contacted with the elastic member in the manner of clinching it from at least two directions, namely the direction of extension of the shaft unit and the direction substantially perpendicular thereto, so that it is possible to buffer the vibrations and impacts from all directions.

In a further embodiment, in which the elastic member is substantially of the cylindrical outer shape, it is possible to provide for a sufficient thickness of the elastic member in the direction of extension of the shaft unit and in the direction substantially perpendicular thereto.

In an additional embodiment, in which the outer peripheral surface of the elastic member has a convex shape when seen from the circumferential direction, the state of contact between the elastic member and the housing member is changed during buffering from the point contact to the surface contact, with the contact surface increasing progressively. Thus, the acceleration of the impact is absorbed as it delineates a curve like a bus tub when time and acceleration are plotted on the abscissa and on the ordinate, respectively, thus moderating even the maximum impact.

BRIEF DESCRIPTION OF THE DRAWINGS

FIG. 16 shows an elastic member, where

DESCRIPTION OF PREFERRED EMBODIMENTS

Figure 1:
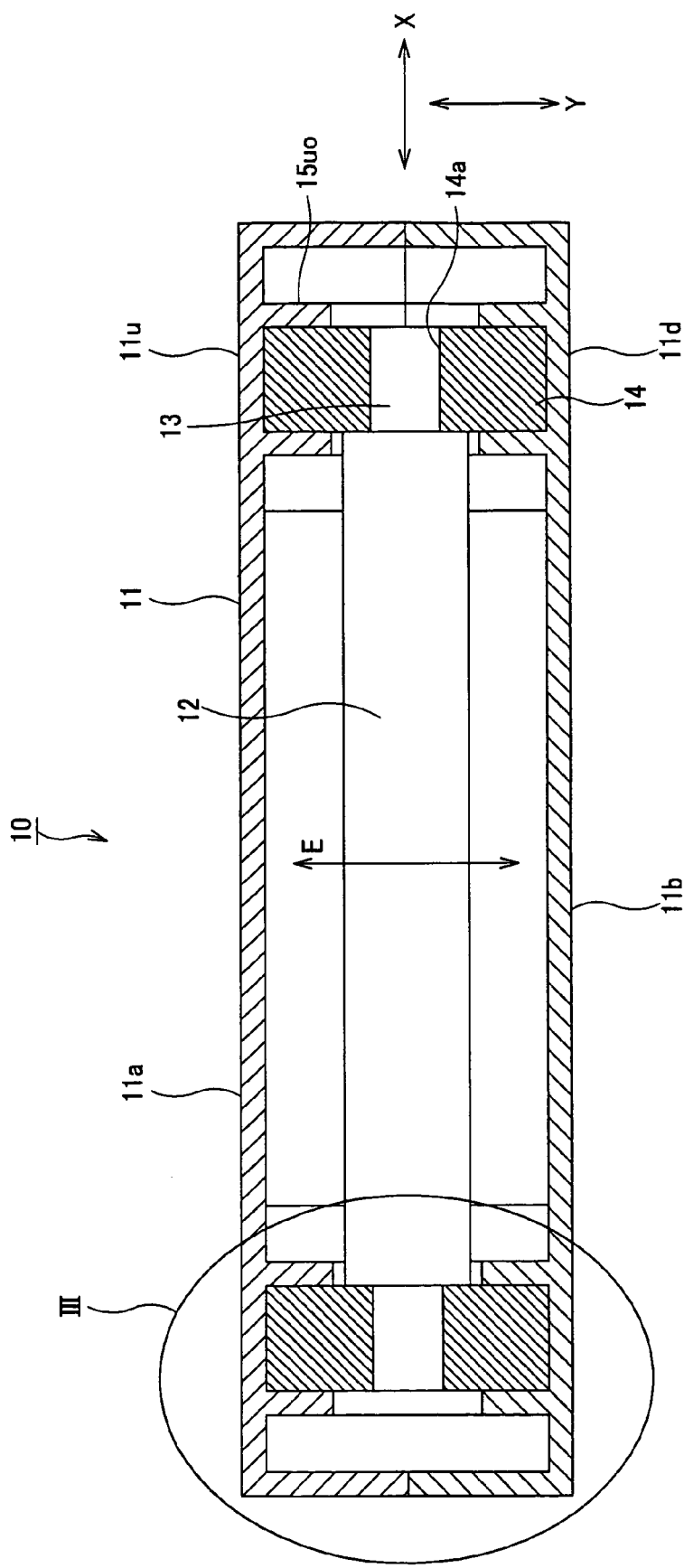
FIG. 1, showing the basic concept of the buffering mechanism of the present invention, in conjunction with FIGS. 2 to 6, depicts a longitudinal cross-sectional view thereof.

A buffering mechanism and a recording and/or reproducing apparatus according to the present invention are now explained in detail with reference to the drawings.

FIGS. 1 to 6 illustrate the basic concept of the buffering mechanism of the present invention.

The buffering mechanism 10 according to the present invention, designed for bufferably accommodating a material or object 12 within a housing member 11, includes at least three shaft units 13, provided to the object 12 for extending in a direction substantially perpendicular to the direction of thickness of the object, and an elastic member 14, formed of an elastic material, and having a cylindrically-shaped shaft accommodating opening 14a. The shaft unit 13 is inserted into the shaft accommodating opening 14a of the elastic member 14. At least a portion of the outer lateral surface of the elastic member 14 is contacted with the housing member 11.

The object 12 is to be protected against external vibrations or impacts. Thus, the object 12 broadly covers commodities or articles liable to be destructed or malfunction under the effect of the vibrations or impacts. For example, a hard disc drive, comprising a magnetic head, mounted to a swinging end of a swing arm, and movable along the radius of a magnetic disc, rotating at a high speed, for recording the information on the magnetic disc or reading out the information recorded on the magnetic disc, tends to collide vigorously against the magnetic disc, under vibrations or impacts, thus causing destruction of the magnetic head or the magnetic disc or failure in tracing the recording area of the magnetic disc by the magnetic head, thus possibly leading to malfunctions. For preventing such destruction or malfunctions of the hard disc drive, it is necessary that a member or a mechanism capable of moderating or absorbing the vibrations or impacts is interposed between the hard disc drive and the housing member carrying or accommodating the hard disc drive. Thus, the hard disc drive is the object to be housed 12. Of course, the object 12 is not limited to the hard disc drive, but may encompass other commodities or articles liable to destructions or malfunctions under the effect of the vibrations or impacts, for example, an optical disc drive, such as a CD-ROM drive or a DVD (digital versatile disc).

The object 12 is housed in the housing member 11. It should be noted that the housing member 11 herein meant accommodates or carries the object 12, while it is unnecessary for the housing member 11 to cover up the object 12 in its entirety like a casing. That is, the housing member 11 at least supports the object 12, such that it may be covering the object entirely or partially, or it may simply support the object 12 without having the covering function.

The object to be housed 12 includes three substantially cylindrically-shaped shaft units 13, extending substantially vertically relative to the direction indicated by arrow E in FIG. 1. Although the buffering mechanism 10 shown in FIGS. 1 to 6 has four shaft units 13, three shaft units suffice, while five or more shaft units may be provided, if such is allowed under the prevailing mounting space or other conditions. However, if the number of the shaft units 13 is less than three, the supporting state of the object to be housed 12 relative to the housing member 11 becomes unbalanced and unstable.

Figure 2:
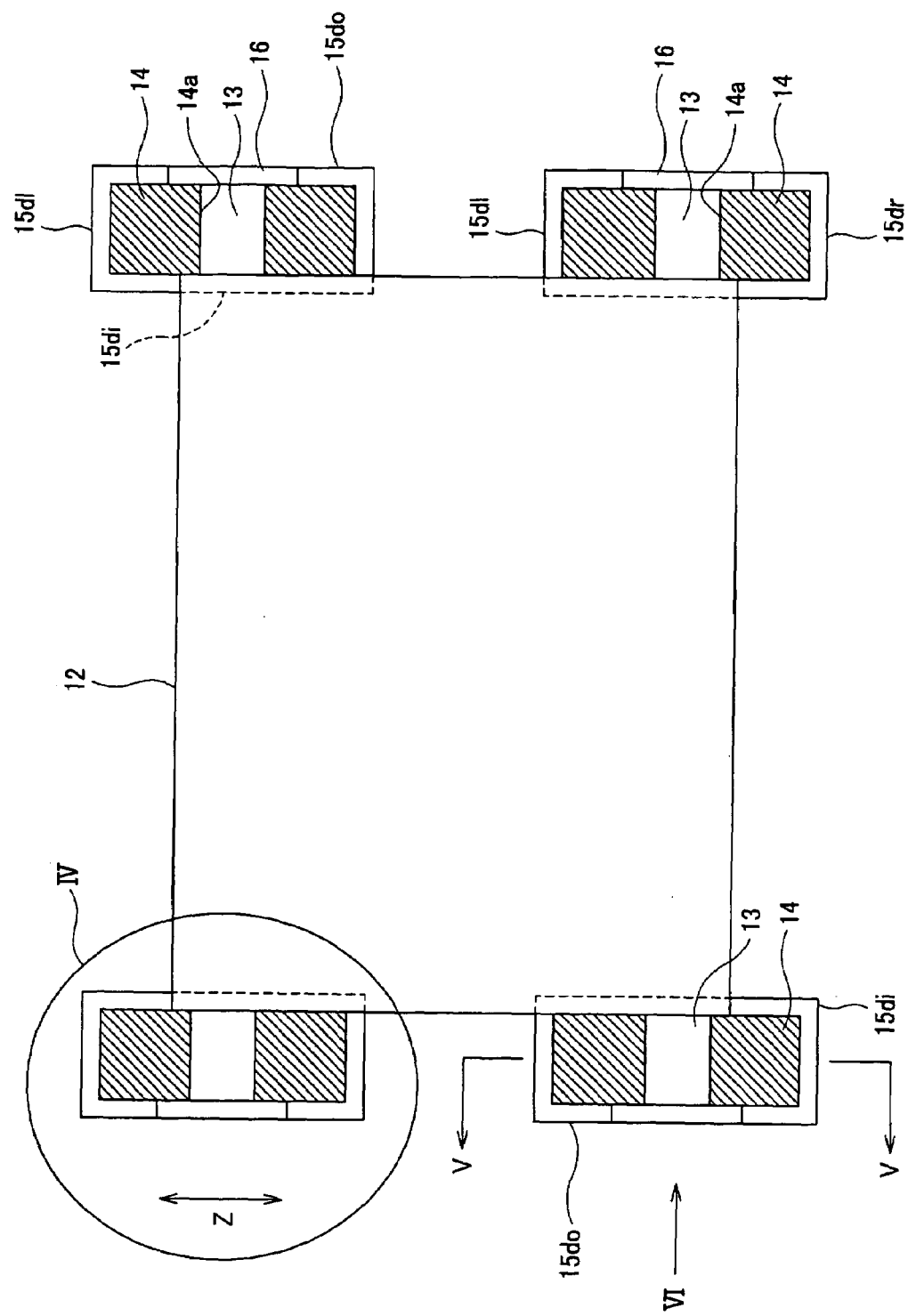
FIG. 2 is a plan view of essential portions thereof.
Figure 3:
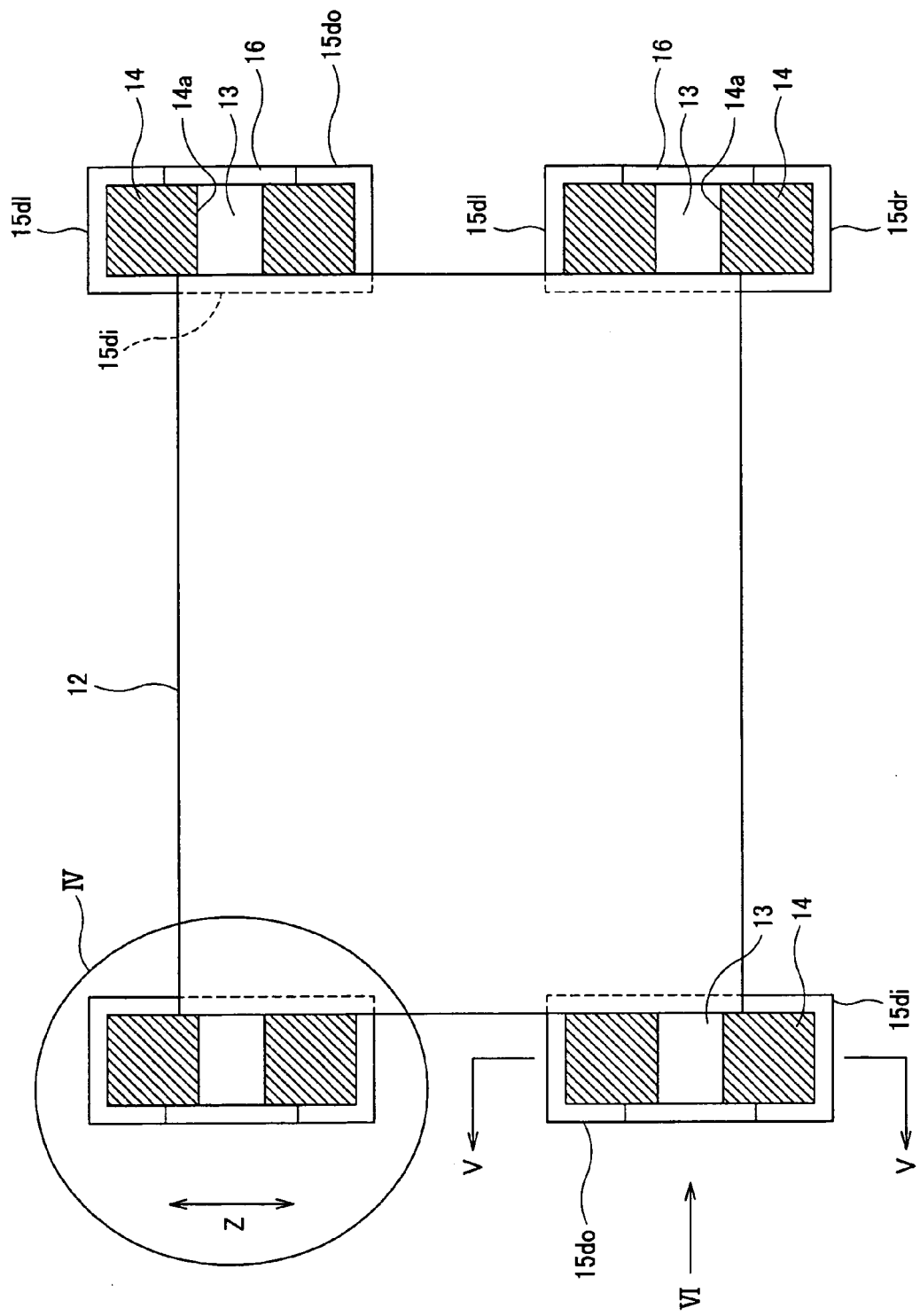
FIG. 3 is an enlarged view of a portion III of FIG. 2.
Figure 4:
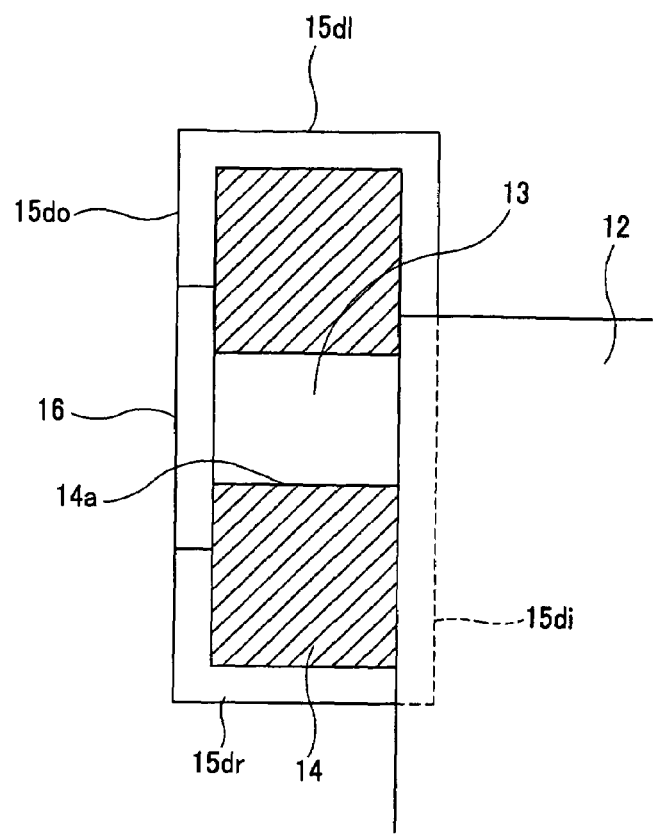
FIG. 4 is an enlarged view of a portion IV of FIG. 2.
Figure 5:
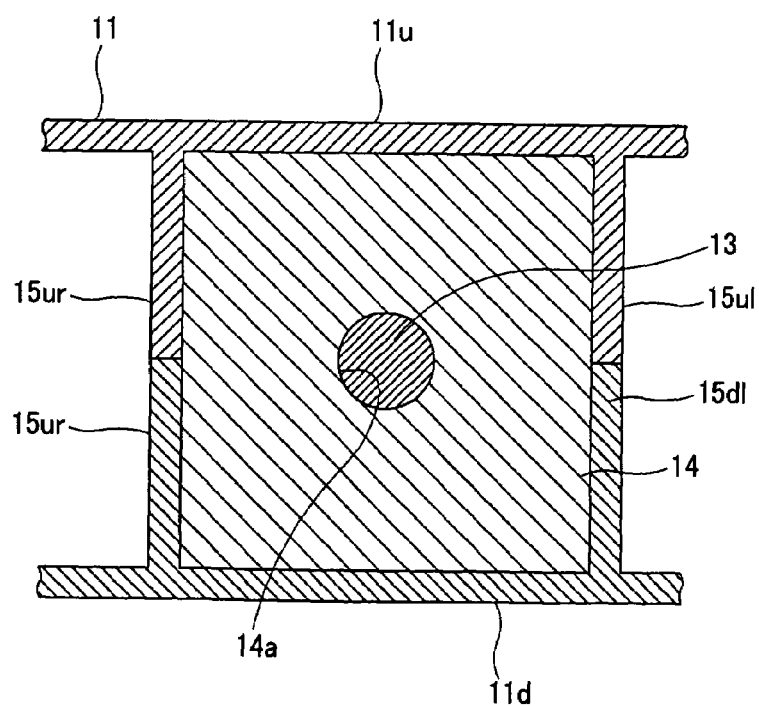
FIG. 5 is an enlarged cross-sectional view taken along line V—V of FIG. 2.
Figure 6:
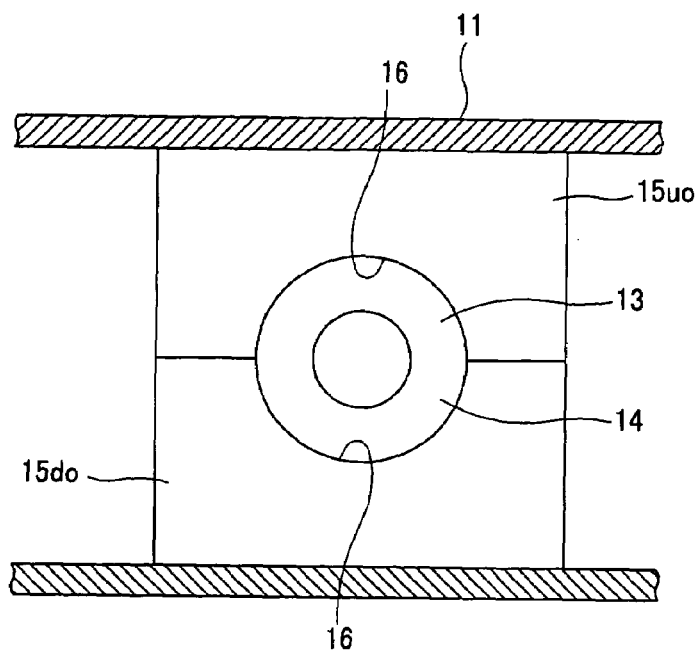
FIG. 6 is an enlarged view looking along arrow VI of FIG. 2.

In FIG. 2, two shaft units 13, 13 are shown extending in mutually opposite directions from both lateral sides of the object to be housed 12. It is however sufficient if the direction of protrusion of the shaft units 13 is substantially perpendicular to the direction of thickness of the object to be housed 12. That is, the direction of protrusion of the shaft units 13 does not have to be the same but may be discrete when seen in the drawing direction of FIG. 2, along the thickness of the object 12. It is preferred that the outer profile of the shaft unit 13 is cylindrical for increasing the contact area of the shaft unit 13 with the elastic member 14 in all directions around the axis thereof.

The elastic member 14 is formed of an elastic material. The elastic material is preferably a material exhibiting rubber-like elasticity, such as an elastomer, e.g. synthetic rubber, or a caoutchouc material, such natural rubber. The elastic member 14 is provided with a cylindrically-shaped shaft accommodating opening 14a for insertion by the shaft unit 13. In FIGS. 1 to 6, the shaft accommodating opening 14a is a through-hole formed in the elastic member 14. Or, the shaft accommodating opening 14a may be a blind hole opening only on one side. At least a portion of the outer lateral side of the elastic member 14 is contacted with the housing member 11. Preferably, the housing member 11 is contacted with the elastic member 14 in a manner of clinching the shaft unit from two directions, namely a direction indicated by arrow X in FIG. 1 and a direction substantially perpendicular thereto, that is, a direction indicated by arrow Y in FIG. 1. Meanwhile, in the buffering mechanism 10 shown in FIGS. 1 to 6, the housing member 11 is contacted with the elastic member 14 not only from the X and Y directions, but also from the direction shown by an arrow Z perpendicular to the directions X and Y in FIG. 2, in the clinching fashion.

That is, the elastic member 14 is contacted with wall sections 15uo, 15ui, 15do and 15di, along the direction of extension of the shaft unit 13 (direction along arrow X), while being contacted with wall sections 11u and 11d along the direction perpendicular to the direction of extension of the shaft unit 13 (direction along arrow Y).

Thus, in the above buffering mechanism 10, the vibrations or impacts from the direction of arrow X in FIG. 1 are buffered by the portions of the elastic member 14 between the wall sections 15uo and 15ui and between the wall sections 15do and 15di, while those from the direction perpendicular to the direction of extension of the shaft unit 13, that is, from the direction of arrow Y in FIG. 1, are buffered by the portions of the elastic member 14 between the shaft 13 and the portion of the elastic member 14 between the shaft 13 and the wall sections 11u and 11d. Since the elastic member 14 is supported by the shaft unit 13 being accommodated not in the slit formed in the outer peripheral surface of the elastic member 14, but in the shaft accommodating opening 14a, a sufficient wall thickness to buffer the vibrations or impacts in the above two directions may be provided without enlarging the outer size, such that a sufficient buffering action may be achieved without complicating the structure or providing separate buffering members.

Meanwhile, in the buffering mechanism 10, the elastic member 14 is contacted with the wall sections 15ul, 15ur and 15dl, 15dr, along the direction of arrow Z in FIG. 2, such that a sufficient buffering action may be achieved against vibrations or impacts operating along the direction Z in FIG. 2.

According to the present invention, if the vibrations or impacts operating only in one direction need to be buffered, in the light of characteristics of the object 12, it is sufficient if the sufficient buffering action is provided at least from the one direction, such that it is only sufficient if at least a portion of the outer lateral surface of the elastic member 14 is contacted with the housing member 11. With the buffering mechanism 10 according to the present invention, the elastic member 14 is interposed between the object to be housed 12 and the housing member 11 by fitting the shaft unit 13 provided to the object 12 in the shaft accommodating opening 14a formed in the elastic member 14. Thus, a sufficient thickness of the elastic member 14 may be provided in a direction which is in need of the buffering action, without enlarging the overall shape of the elastic member 14. Moreover, since the object 12 and the elastic member 14 are contacted with each other via the cylindrically-shaped shaft units 13 introduced into the substantially cylindrically-shaped shaft units 13 fitted into the shaft accommodating opening 14a of the elastic member 14, a sufficient contact area may be provided between the object 12 and the elastic member 14, such that the elastic member 14 is able to sufficiently support and buffer the object 12.

Although the elastic member 14 is deformed during the buffering action, the elastic member 14 is supported by the object 12 by the shaft unit 13 being fitted into the shaft accommodating opening 14a, and hence there is no risk of the elastic member 14 being detached from the shaft unit 13.

In the above-described buffering mechanism 10, in which the housing member 11 is to be contacted with the elastic member 14 in three reciprocally perpendicular directions of X, Y and Z, in a manner of clinching from both sides, plural wall sections 15, 15, . . . are provided to a top plate 11a and a bottom plate 11b of the housing member 11 so that these wall sections delimit a rectangular-shaped frame when looking from the up-and-down direction. These wall sections 15, 15, . . . and portions 11u, 11d of the top plate 11a and bottom plate 11b are contacted by preset portions of the elastic member 14. However, these wall sections 15, 15, . . . and the portions 11u, 11d are not mandatory, such that the sidewall of the housing member 11 may be used as a portion to be contacted by the elastic member 14. Moreover, the portions contacted by the elastic member 14 need not be provided as one with the housing member 11, and a separate member may be mounted to the housing member 11 and provided with a portion contacted by the elastic member 14. This separate member, mounted to the housing member 11, may also be deemed to be a part of the housing member 11. Moreover, if there is no necessity of providing a portion contacted with the elastic member 14 in a clinching fashion from three reciprocally perpendicular directions, not all of the above-mentioned wall sections 15, 15, . . . or the portions 11u, 11d are needed. That is, only the wall sections for the direction in need of contact are sufficient. However, if the portions of the housing member 11 contacted with the elastic member 14 are formed by the wall sections 15uo (do), 15ui (di), 15ul (dl) and 15ur (dr), interconnected as one in a frame shape when seen in the up-and-down direction, and by the wall sections 11u (d) delimiting the upper and lower sides of the frame-shaped section, it is possible to control the movement of the object in the fore-and-aft direction, in the left-and-right direction and in the up-and-down direction by the elastic member 14, while there is no necessity of providing separate means for controlling the movement of the object 12.

Figure 7:
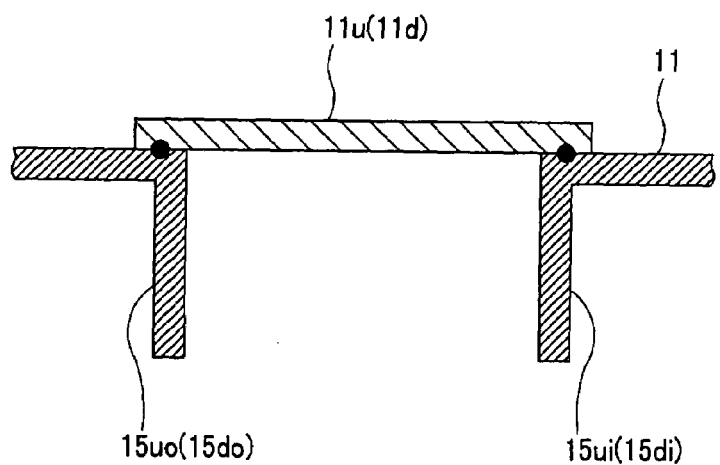
FIG. 7 is an enlarged cross-sectional view showing essential portions of a modification of an abutment plate.

The wall sections 15, 15, . . . need not be provided as one with one another or in the shape of a frame, but may be formed independently of one another. However, when the wall sections 15, 15, . . . are formed as one in the form of a frame, the wall sections reinforce one another such that a sufficient strength and a higher resistance against strong vibrations or impacts may be developed. Meanwhile, when the housing member 11 is to be formed as a resin molded product, the wall sections 15, 15, . . . may be formed as one in the form of a frame, while the wall sections 11$u$, 11$d$ may also be formed as one (see FIGS. 1 to 6). However, when the housing member 11 is formed by a metal plate and the wall sections 15, 15, . . . are formed by drawing, the wall sections 11$u$, 11$d$ cannot be formed as one. Thus, these wall sections 11$u$, 11$d$ are post-mounted such as by welding, as shown in FIG. 7.

If, in case the structure shown in FIGS. 1 to 6 is used, the distal end of the shaft unit 13 is contacted with the wall sections 15$uo$, 15$do$, the elasticity proper to the elastic member 14 cannot be exploited. Thus, cut-outs 16, 16 need to be provided in the wall section 15$uo$, 15$do$ to prevent the distal end of the shaft unit 13 from being contacted with the wall sections 15$uo$, 15$do$. It is also possible to provide a suitable gap between the wall sections 15$uo$ and 15$do$ to cause the distal end of the shaft unit 13 to be located facing the gap.

Figure 8:
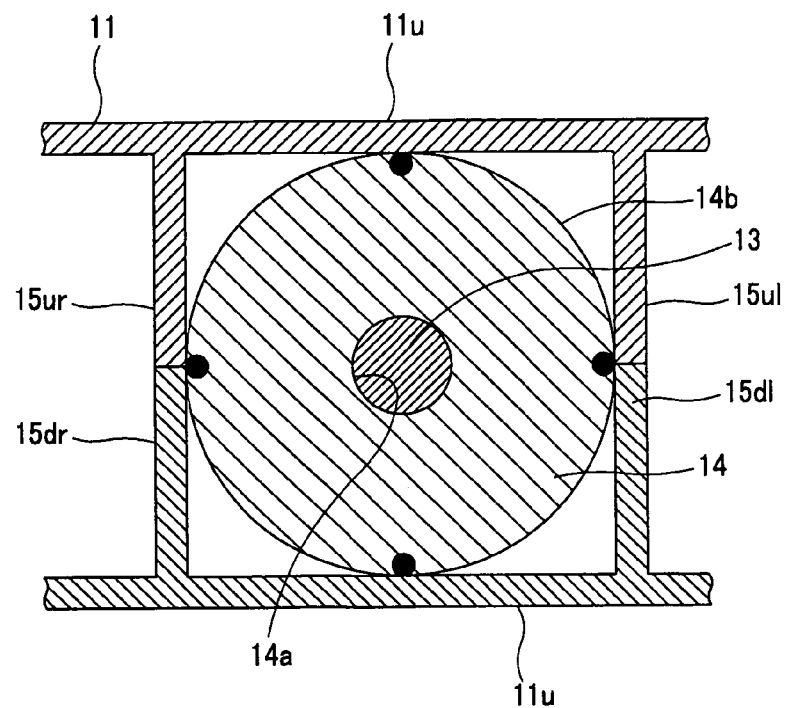
FIG. 8 shows a modification of an elastic member, in conjunction with FIG. 9, and specifically shows the modification by a cross-sectional view taken in a direction perpendicular to a shaft unit.
Figure 9:
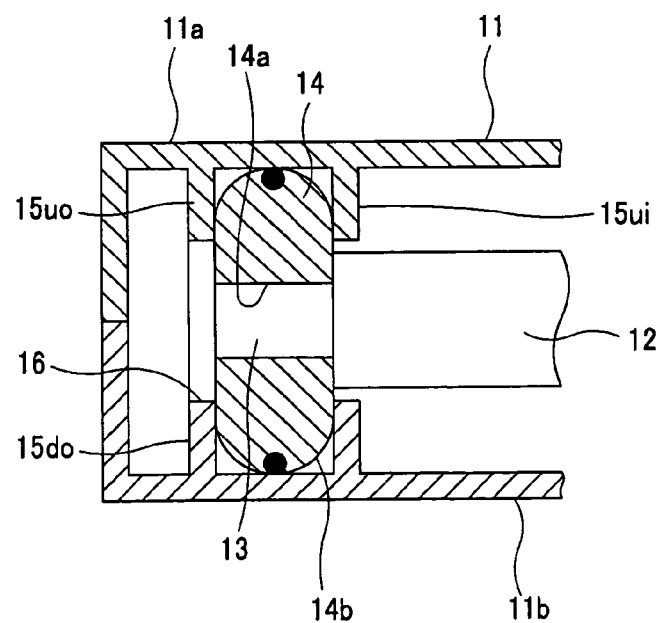
FIG. 9 is an enlarged cross-sectional view taken along a shaft unit.

There is no particular limitation to the shape of the elastic member 14 provided that a sufficient thickness of the elastic member is assured in a direction of buffering the vibrations or impacts. However, the elastic member 14 is preferably of a tire shape, as shown for example in FIGS. 8 and 9. Thus, the outer profile of the elastic member 14 is preferably such that the elastic member is circular when seen along the axis (see FIG. 8) and the outer peripheral surface 14$b$ has a convex shape when seen from the circumferential direction (see FIG. 9). Thus, during the normal operation, that is when the elastic member 14 is not performing the buffering action, the outer peripheral surface 14$b$ of the elastic member 14 is substantially in a point-to-point contact with the wall sections 11$u$, 11$d$, 15$ul$, 15$ur$, 15$dl$ and 15$dr$, at contact points, as indicated in FIGS. 8 and 9. However, during the buffering, the point contact transfers to the surface contact, with the contact area increasing progressively. Thus, if the abscissa and the coordinate denote time and acceleration, respectively, the acceleration of impacts is absorbed, as a bus-tub like curve is delineated, thus moderating even the maximum impact.

Figure 10:
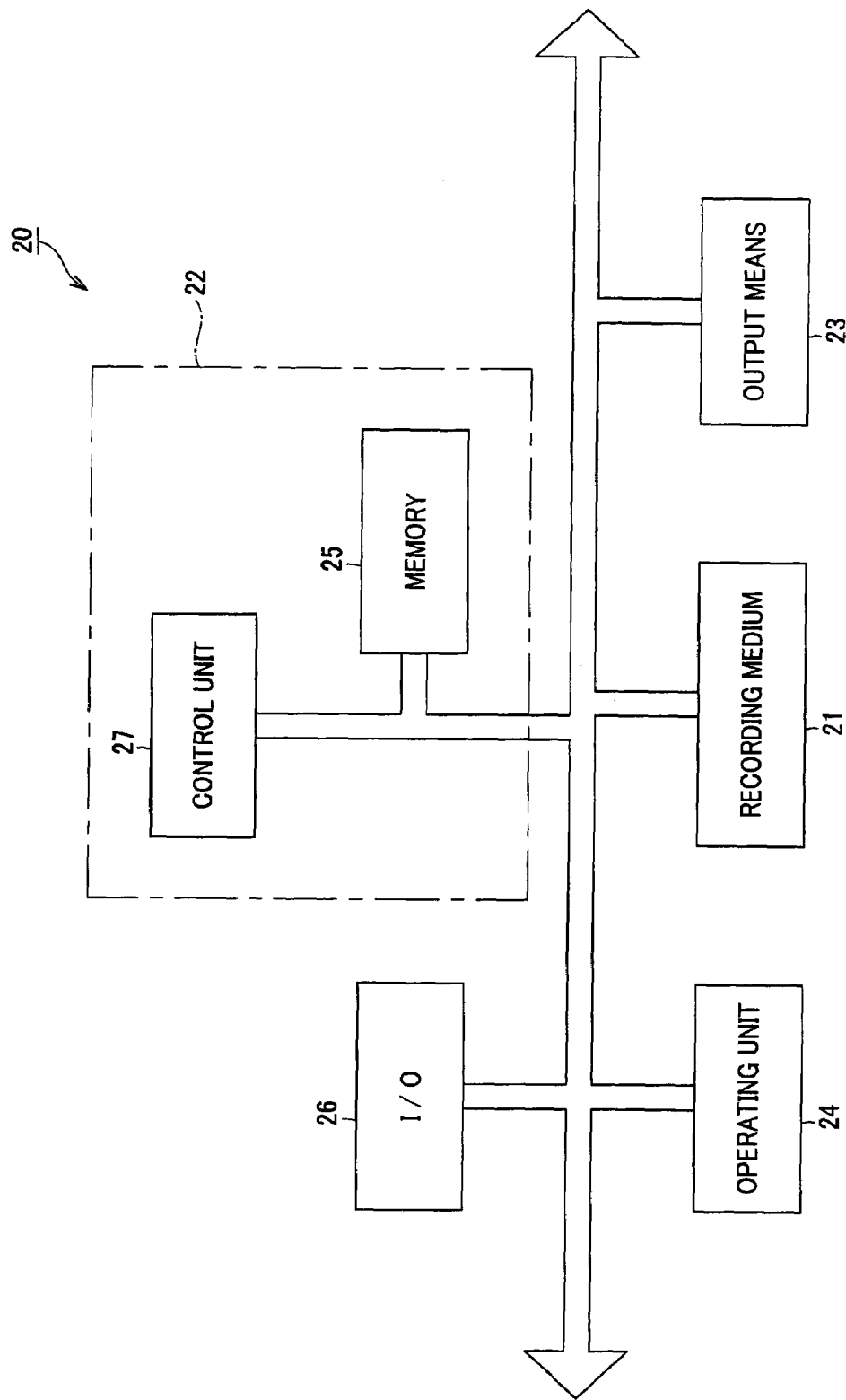
FIG. 10 is a block diagram showing an illustrative structure of a recording and/or reproducing apparatus according to the present invention.
Figure 11:
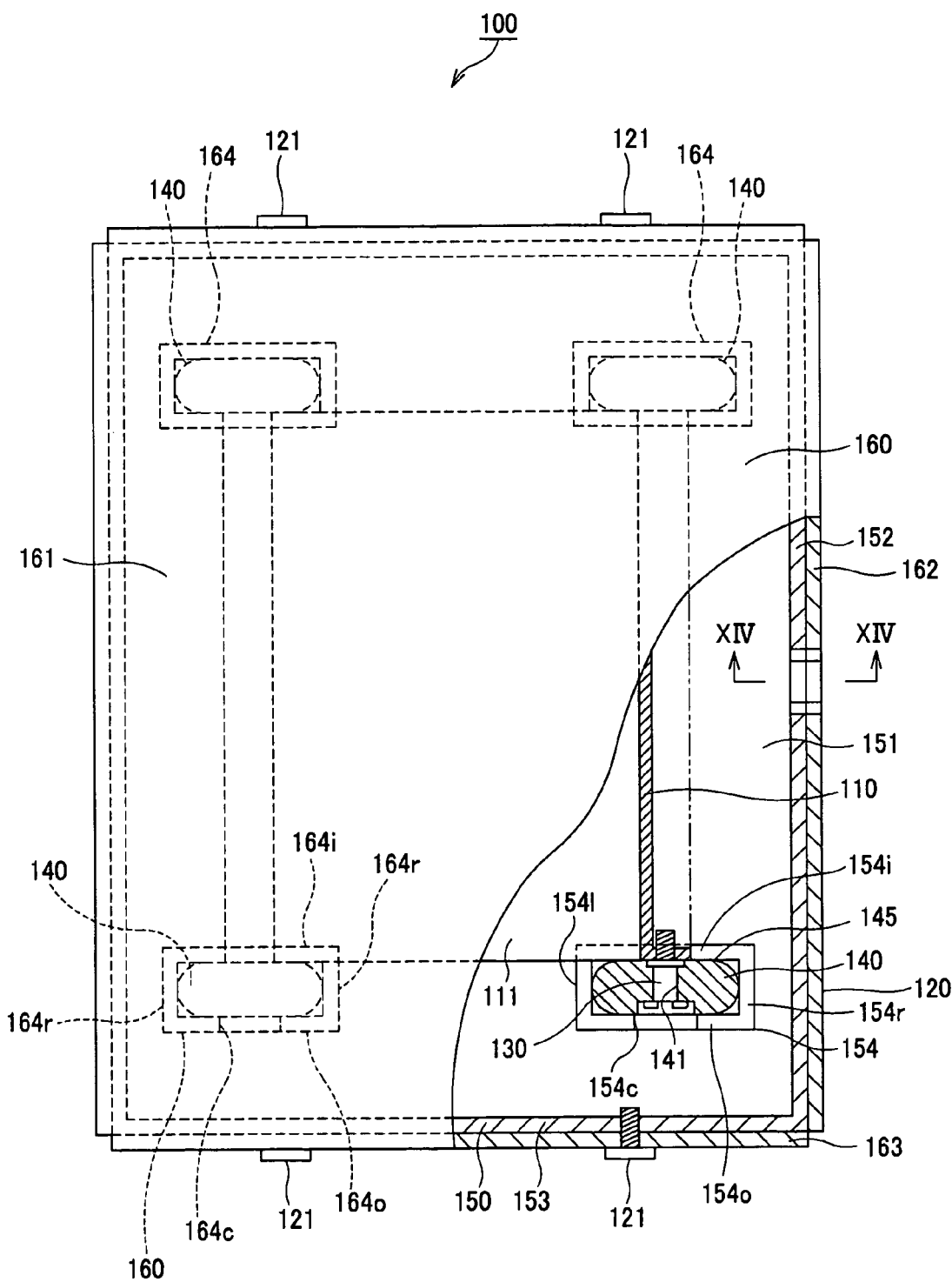
FIG. 11 shows a first embodiment of the buffering mechanism of the present invention, in conjunction with FIGS. 12 to 16, and specifically depicts a plan view of the buffering mechanism, with a portion thereof being broken away.
Figure 12:
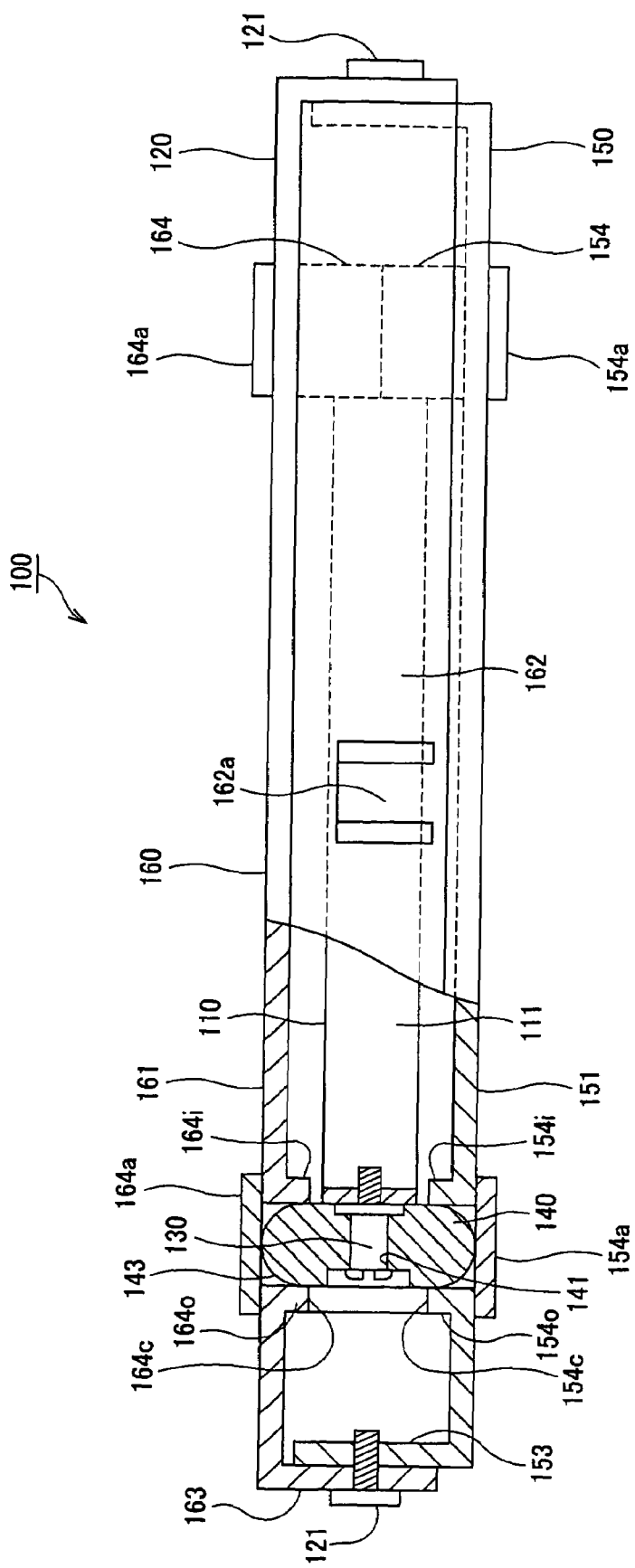
FIG. 12 is a side view thereof, partially broken away.
Figure 13:
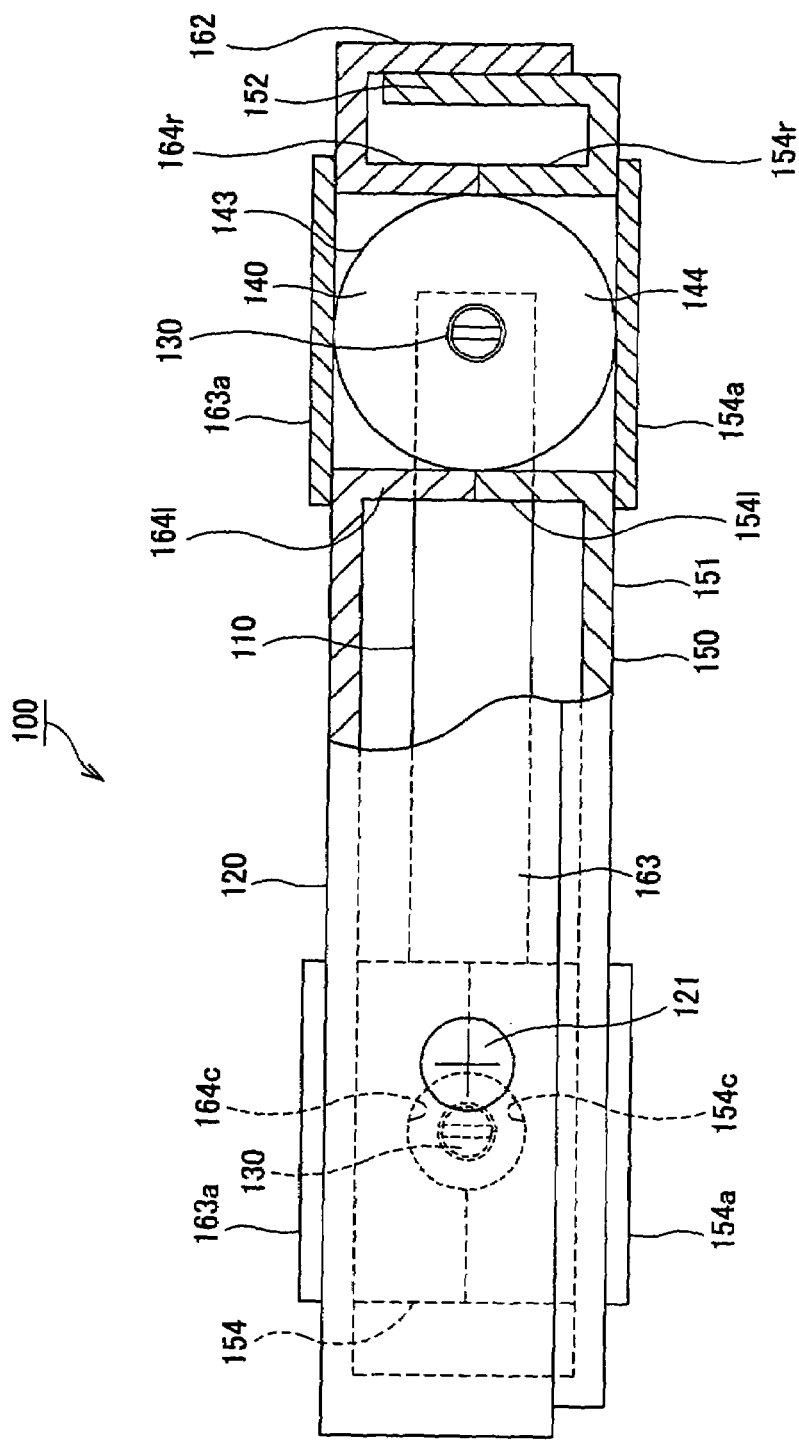
FIG. 13 is an end view thereof, partially broken away.
Figure 14:
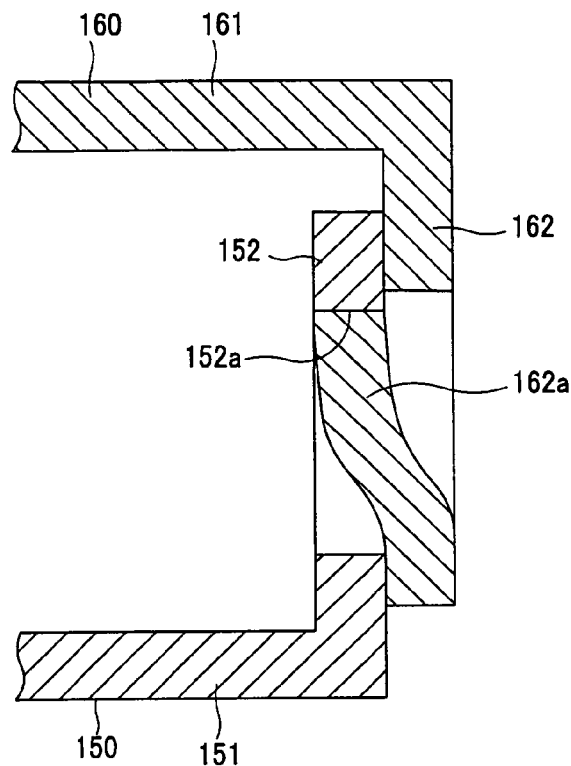
FIG. 14 is an enlarged cross-sectional view, taken along line XIV to XVI of FIG. 11.

FIG. 10 shows schematics of the recording and/or reproducing apparatus according to the present invention, A recording and/or reproducing apparatus 20 includes a recording medium 21 and a recording and/or reproducing unit 22 for recording and/or reproducing information signals for the recording medium 21. There are also provided a housing member for housing the recording medium 21, at least three shaft units extending in a direction substantially perpendicular to the thickness of the recording medium, and an elastic member formed of an elastic material and carrying cylindrically-shaped shaft accommodating openings. The shaft units are engaged in the shaft accommodating openings. At least a portion of the outer lateral side of the elastic member is contacted with the housing member.

That is, the present recording and/or reproducing apparatus 20 includes a buffering mechanism for accommodating the recording medium 21. For example, when the recording medium 21 is a hard disc drive, there is provided a hard disc driving device composed of the hard disc drive 21 accommodated in a casing (housing member). Meanwhile, the buffering mechanism composed of the recording medium 21 accommodated in the housing member is the same as that explained in connection with FIGS. 1 to 9 and hence is not explained here specifically. The recording medium 21 is not limited to the hard disc drive and encompasses other sorts of the recording mediums, such as an optical disc drive, which has to be protected against vibrations or impacts.

The structure shown as an example in FIG. 10 as an illustrative structure of the recording and/or reproducing apparatus 20 includes, in addition to the recording medium 21, an output means 23, an operating unit 24, a memory 25, an input/output port 26 and a control unit 27. The control unit 27 oversees the entire operation of the recording and/or reproducing apparatus 20. When supplied with a preset command through an actuating unit 24, the control unit 27 allows a pre-defined sequence of operations, such as information recording or reproduction for the recording medium 21 or information outputting by the output means 23, to be carried out. Thus, in this illustrative structure, the recording and/or reproducing unit 22 is formed by the control unit 27 and the information, such as programs stored in the memory 25 and which is referenced by the control unit 27 in carrying out the operations. Meanwhile, the recording and/or reproducing unit of the recording and/or reproducing apparatus according to the present invention is not limited to the control unit 27 and the information stating the sequence of operations for the control unit 27, but may, of course, be a set of individual recording circuits or reproducing circuits, each of which is dedicated to specified operations.

It is unnecessary to provide both the recording unit and the reproducing unit. That is, the terminology [a recording and/or reproducing unit for information recording and/or reproduction] encompasses three concepts, namely [a recording/reproducing unit for information recording and reproduction], [a recording unit for performing only information recording] and [a reproducing unit fro performing only information reproduction]. Any one of these three sorts of the unit is encompassed by the concept of the terminology [a recording and/or reproducing unit for information recording and/or reproduction].

In case a keyboard is included in the operating unit 24, the information may be recorded by recording the character information, entered via the keyboard, various information entered from outside via the input/output port 26, such as the character information from e.g. an OCR device, the speech information from a speech processing apparatus, the picture information from a picture processing apparatus, or the various information acquired from the communication, on the recording medium 21. The information is also reproduced by taking out the information recorded on the recording medium 21 and by processing the information so taken out, using the output means 23, to a form suitable for outputting. The contents of the output means 23 are not specifically determined because the sort of the output means 23 differs with the sort of the information reproduced. For example, if the information reproduced is the character or picture information, various types of displays, such as liquid crystal display, or a printer, serve as the output means 23, whereas, if the information reproduced is the speech information, a loudspeaker serves as the output means 23. There are occasions wherein the information reproduced is output to external equipment connected to the input/output port 26.

Consequently, the recording and/or reproducing apparatus 20 according to the present invention encompasses a wide range of apparatuses from an apparatus dedicated to a specified function to a general-purpose apparatus. The apparatus dedicated to a specified function may be exemplified by a video recording and/or reproducing apparatus having a hard disc drive as the recording medium 21 and an audio recording and/or reproducing apparatus having a magneto-optical disc drive as the recording medium 21. The general-purpose apparatus may be exemplified by a notebook personal computer having a hard disc drive and a DVD-RAM drive as the recording medium 21. Of course, the recording and/or reproducing apparatus according to the present invention is not limited to these exemplified apparatuses.

With the recording and/or reproducing apparatus 20 according to the present invention, the recording medium 21 may be effectively protected against vibrations or impacts so that stable recording and/or reproducing operations may be assured.

FIGS. 11 to 16 show a first embodiment of the buffering mechanism according to the present invention.

A buffering mechanism 100 includes a housing member 220 supporting or accommodating an object to be housed 210. In this buffering mechanism 100, the object to be housed 110 is a hard disc drive, while the housing member 120 is an accommodating casing.

The hard disc drive 110 includes, within a flat-shaped housing 111, a swing arm, not shown, a magnetic head carried by the distal end of the swing arm, a rotatable hard disc, and a swing arm driving unit. Plural shaft units 130, 130, . . . are protuberantly formed at the positions spaced apart most prominently along the width-wise direction of both end faces of the casing 111. These shaft units 130, 130, . . . provided at respective different end faces, are protruded in the mutually opposite directions. Thus, the shaft units 130, 130, . . . are protruded in a direction substantially perpendicular to the width-wise direction of the hard disc drive 110.

Figure 15:
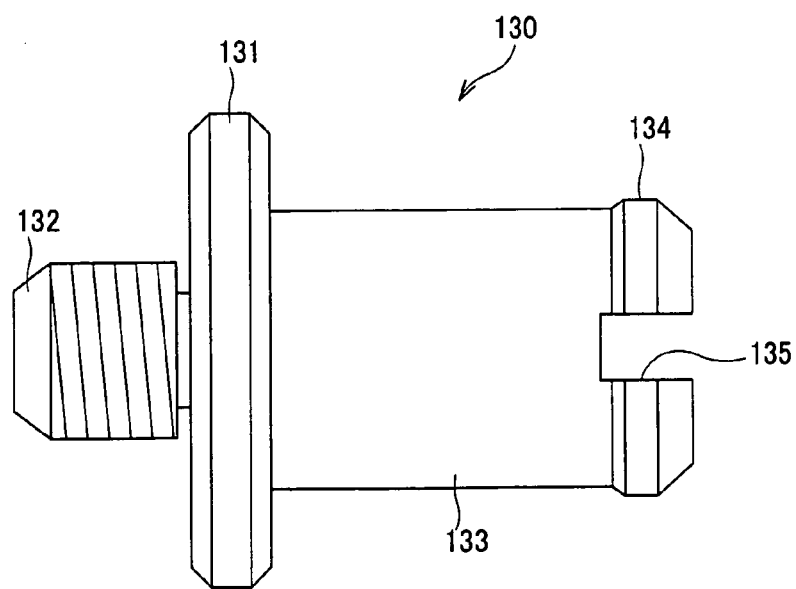
FIG. 15 is an enlarged side view showing the shaft unit.

The shaft unit 130 is shown in great detail in FIG. 15. The shaft unit 130 is made up by a screw shaft 132 and a cylindrically-shaped drum unit 133, extending in mutually opposite directions from both sides of a disc-shaped flange 131. An anti-detachment rib 134 is protuberantly formed on the outer rim of the foremost part of the cylindrically-shaped drum unit 133. A slit 135 is formed in the foremost end face of the drum unit 133. The shaft unit 130 is unified to the hard disc drive 110 by the screw shaft 132 of the shaft unit 130 being screwed into a tapped hole 112 (see FIG. 12) formed in the end face of the housing 111 of the hard disc drive 110. Meanwhile, when the shaft unit 130 is threadedly attached to the hard disc drive 110, a tightening jig, such as a driver, may be engaged in the slit 135 and rotated for mounting the shaft unit in position.

Figure 16B:
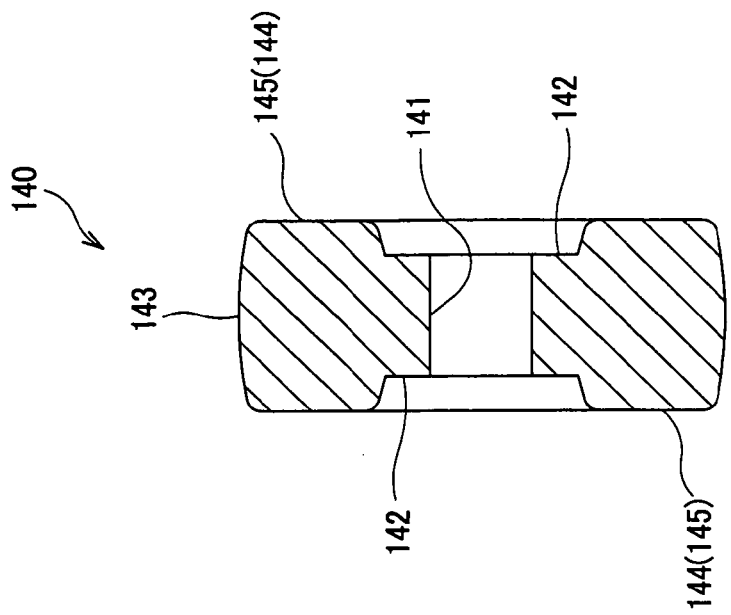
FIG. 16A shows the member along the axial direction and FIG. 16B is a central longitudinal cross-sectional view thereof.
Figure 16A:
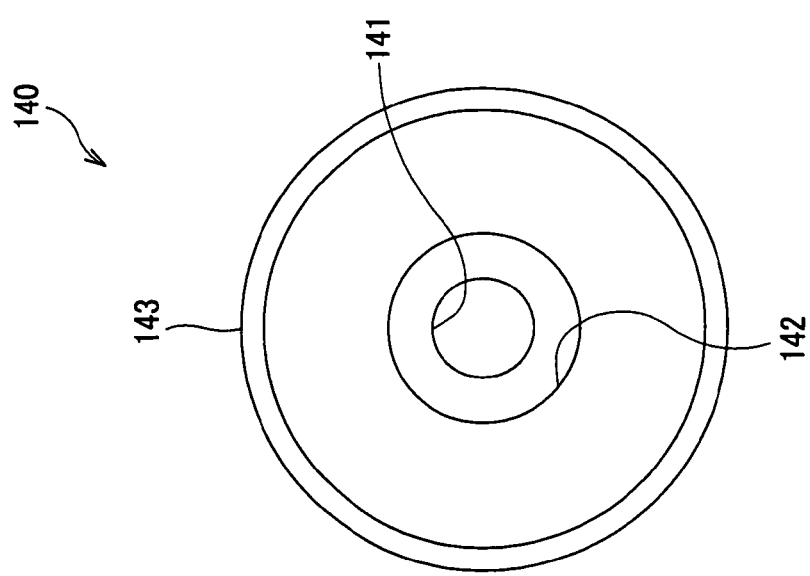
Figure 17:
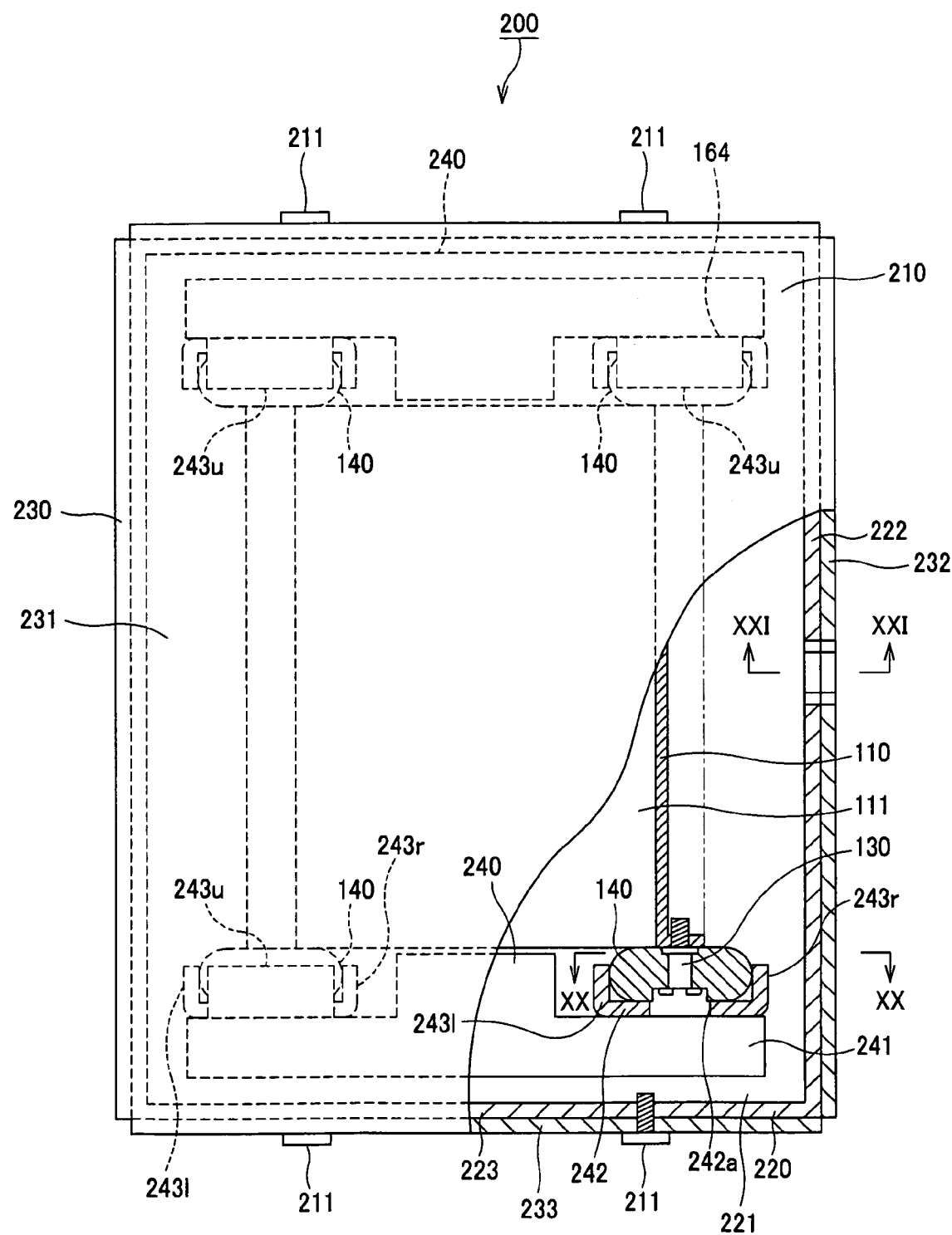
FIG. 17 shows a second embodiment of the buffering mechanism of the present invention, in conjunction with FIGS. 18 to 21 and specifically depicts a plan view thereof, partially broken away.
Figure 18:
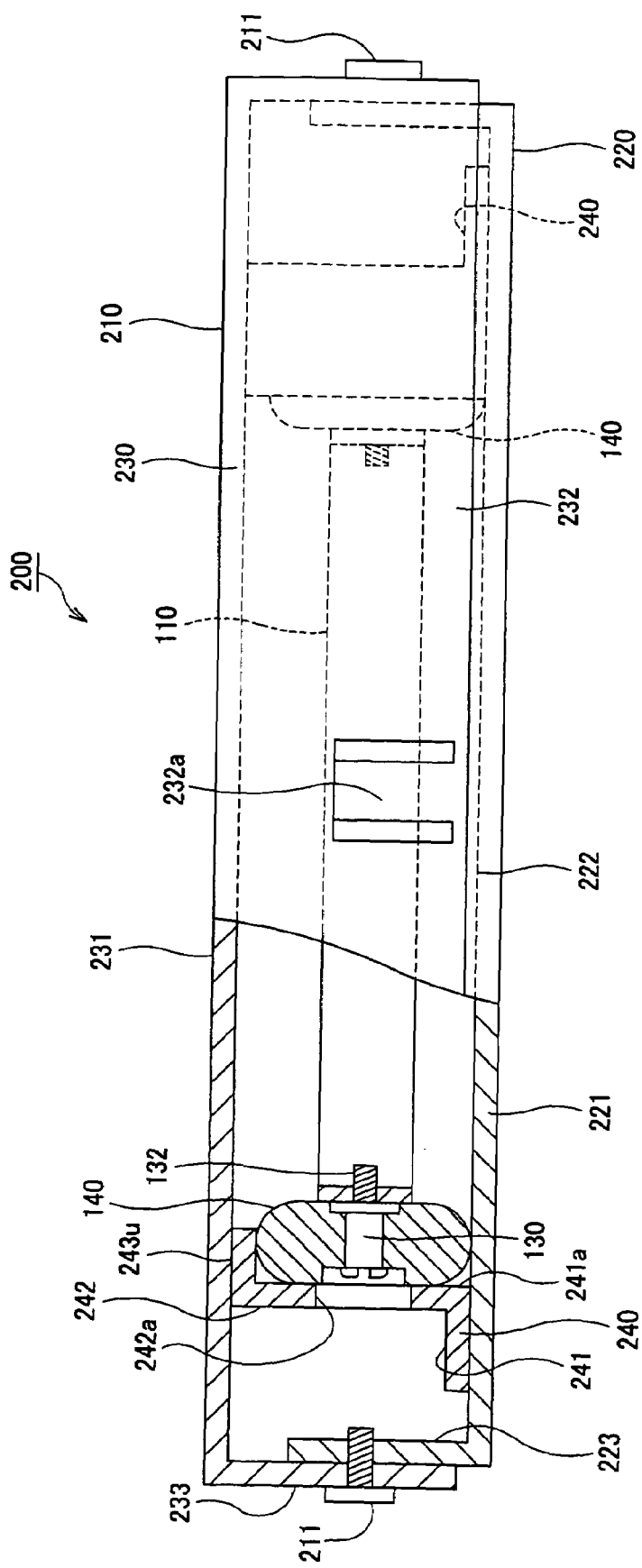
FIG. 18 is a side view thereof, partially broken away.
Figure 19:
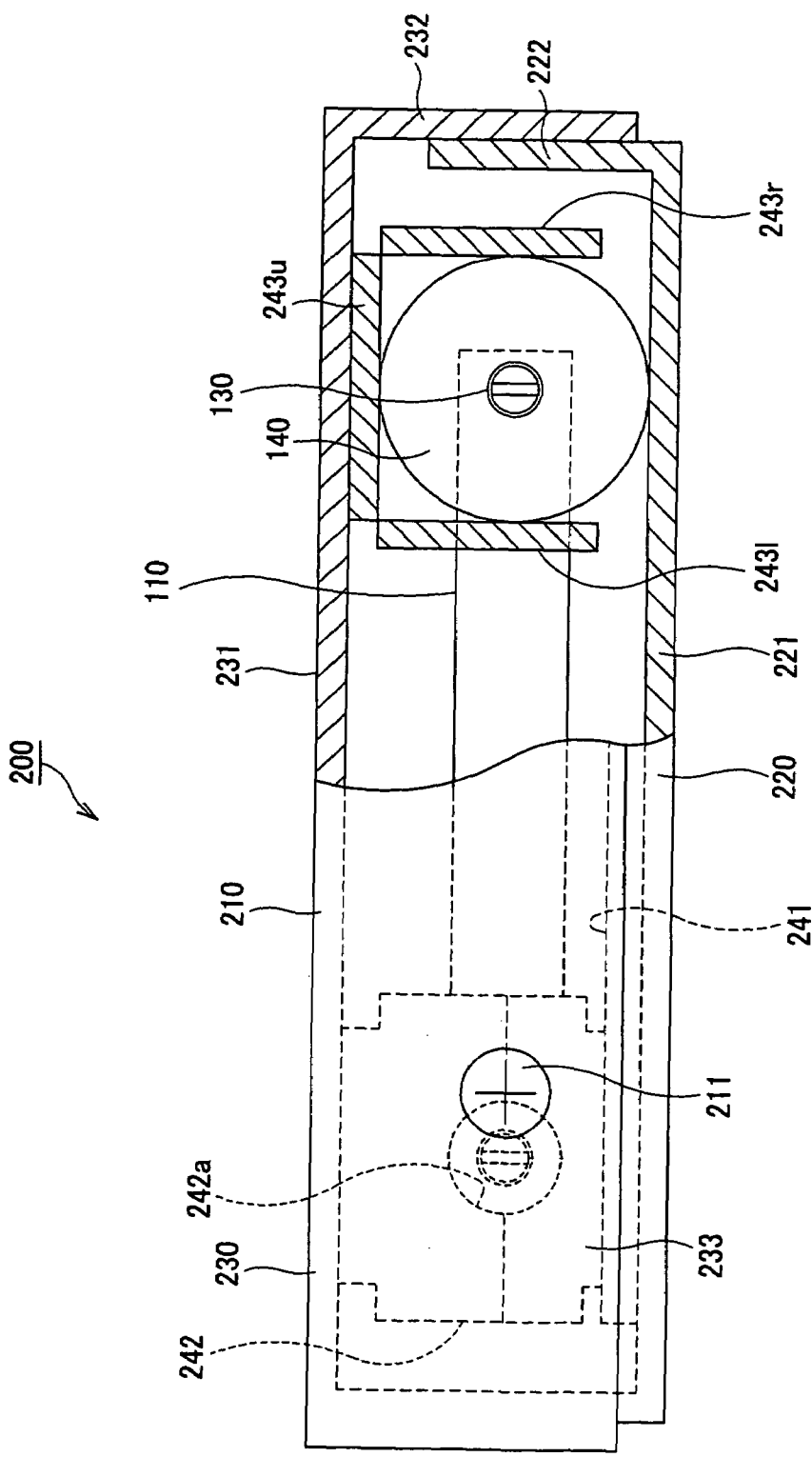
FIG. 19 is an end view thereof, partially broken away.
Figure 20:
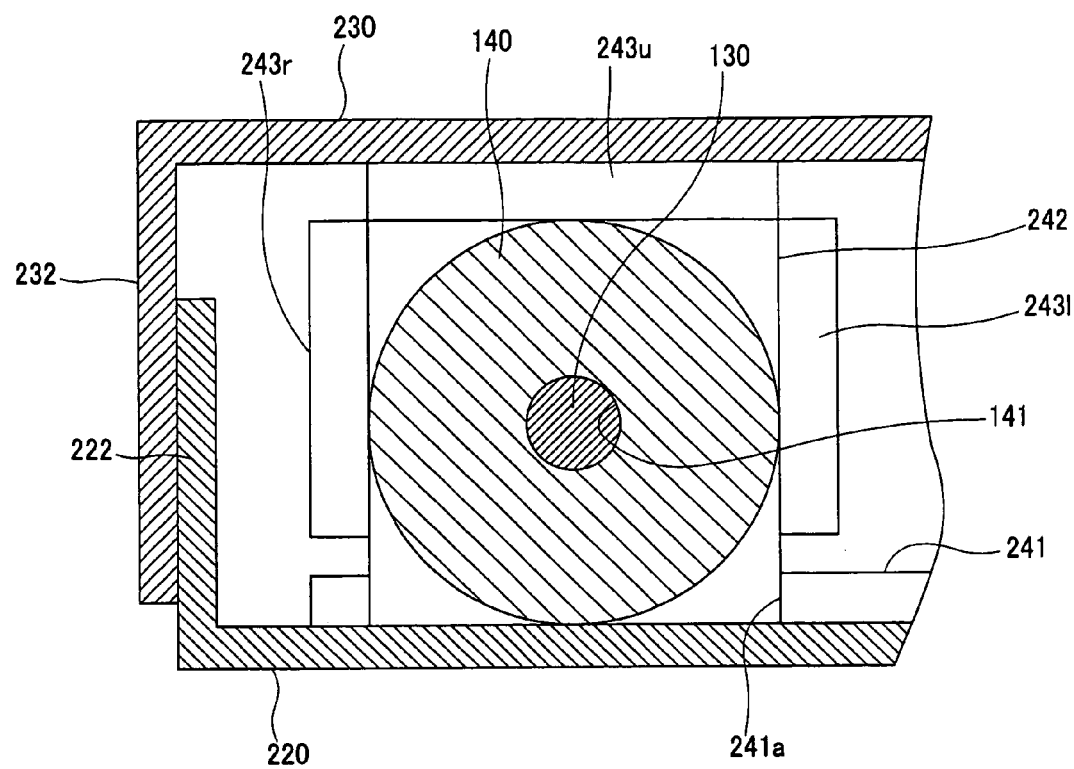
FIG. 20 is an enlarged cross-sectional view, taken along line XX—XX of FIG. 17.
Figure 21:
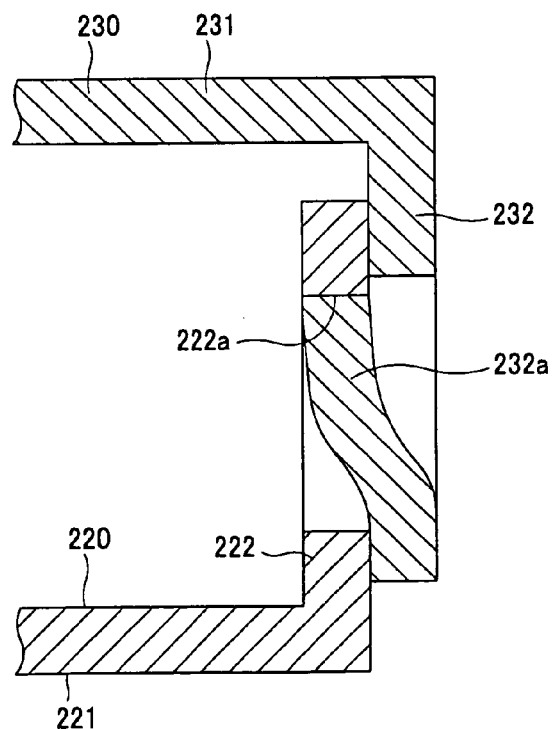
FIG. 21 is an enlarged cross-sectional view, taken along line XXI to XXI of FIG. 11.
Figure 22:
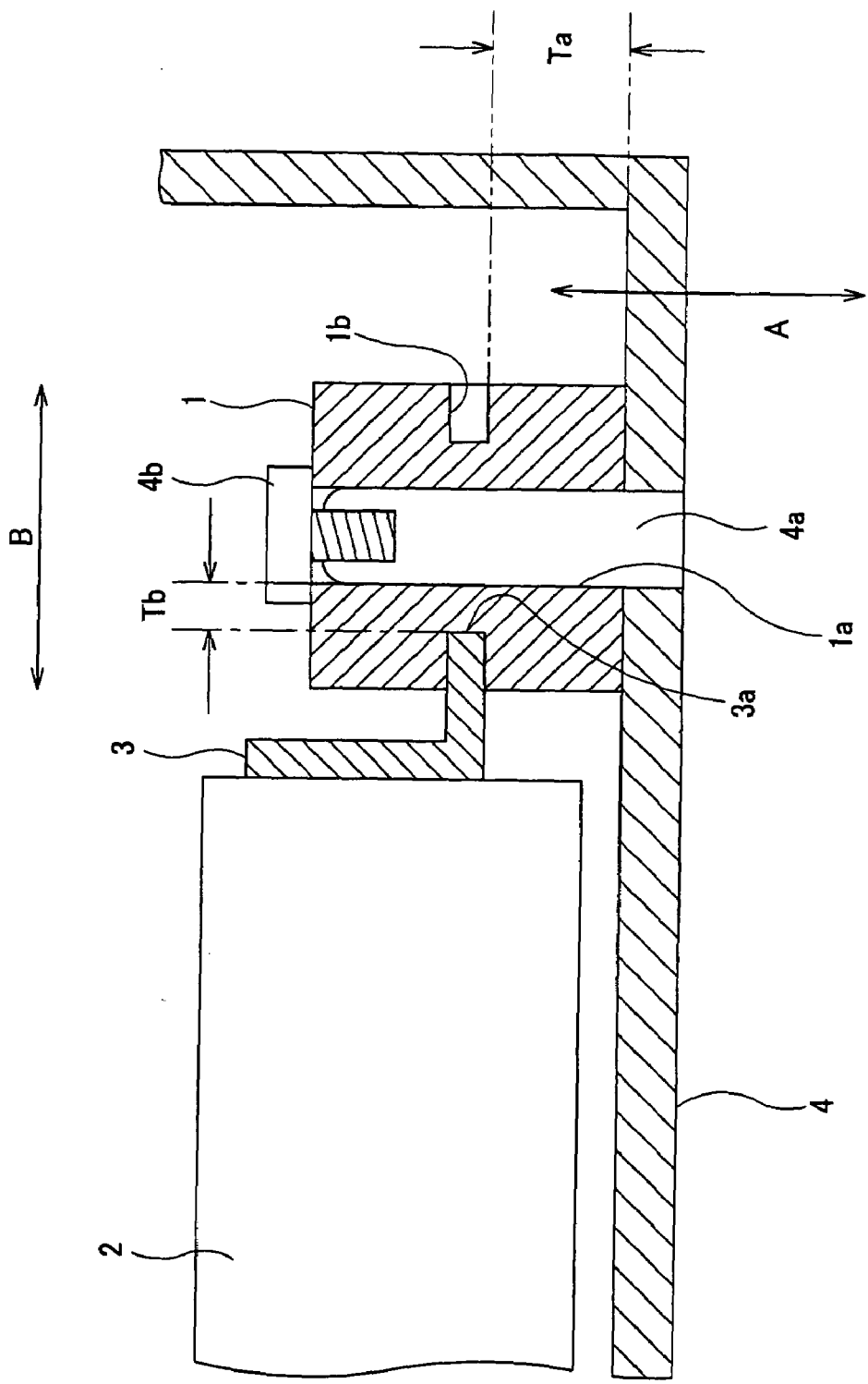
FIG. 22 shows a conventional typical buffering mechanism, in conjunction with FIG. 23, and specifically depicts a longitudinal cross-sectional view showing essential portions thereof.
Figure 23:
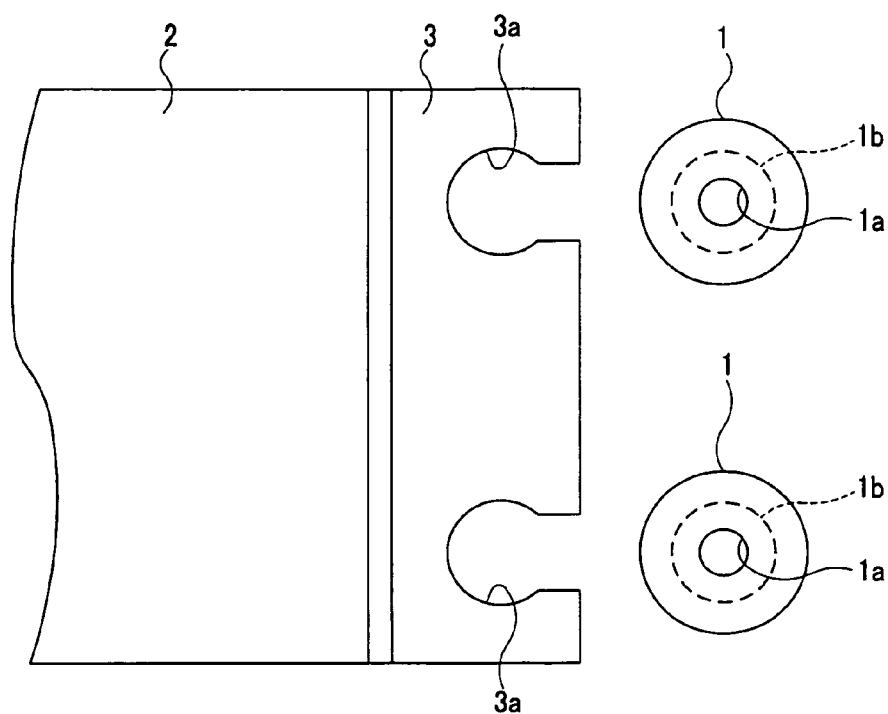
FIG. 23 is a plan view showing essential portions, with the housed material and the elastic member being shown separated from each other.
Figure 24:
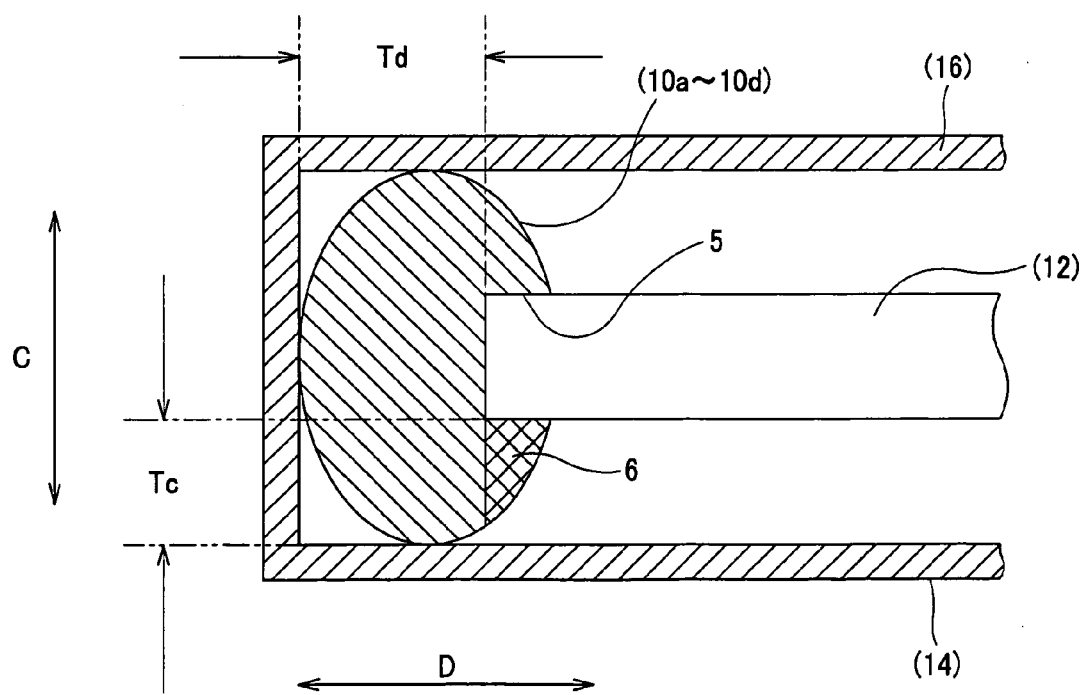
FIG. 24 is a longitudinal cross-sectional view showing essential portions of another conventional typical buffering mechanism.

Four elastic members 140, 140, are supported to the hard disc drive 110 by plural shaft units 130, 130. The elastic member 140 is formed of an elastic material, such as elastomer, and is formed to an outer shape of a tire, that is, a disc or a cylinder of an increased thickness, as shown in FIG. 16A. A cylindrically-shaped shaft accommodating opening 141 is formed for extending through the center of the elastic member 140. A pair of recesses of shallow depth 142, 142 are formed in the portions in both lateral sides of the elastic member 140 surrounding the center, that is, the cylindrically-shaped shaft accommodating opening 141. The inner diameter of each of the recesses 142, 142 is approximately equal to the outer shape of the flange 131 of the shaft unit 130. The elastic member 140 has a convex outer peripheral surface 143 when seen along the peripheral direction, as shown in FIG. 16B.

The elastic member 140 is supported by the hard disc drive 110 by the drum unit 133 of the shaft unit 130 being introduced into the shaft accommodating opening 141. As the elastic member 140 is supported by the shaft unit 130, the flange 131 of the shaft unit 130 is fitted in the recess 142 on one surface of the elastic member 140, whilst the rib 134 at the foremost part of the flange 131 of the drum unit 133 is engaged in an opening edge of the shaft accommodating opening 141 of the elastic member 140, whereby the elastic member 140 is supported in stable state by the shaft unit 130 against detachment from the shaft unit 130.

The accommodating casing 120 is made up by a flat bottom plate 150 having an open side and an upper lid 160 covering the upper side of the bottom box 150. The bottom box 150 and the upper lid 160 are each formed by machining a metal plate.

The bottom plate 150 is made up by a rectangular-shaped bottom plate 151 and lateral plates 152, 152 and end plates 153, 153 upstanding from the four sides of the bottom plate 151. These plates 152, 152, 153, 153 are formed unitarily in continuation to one another. The mid portions of the side plates 152, 152 are provided with engagement holes 152a, 152a.

Towards both ends and towards both lateral sides of the bottom plate 151 are formed square tubular shaped receiving portions 154, 154, . . . such as by stamping upwards. That is, the receiving portions 154 are each formed by four wall sections 154o, 154i, 154l, 154r, interconnected together to form a sole square tube. A semi-circular cut-out 154c (see FIG. 13) is formed centrally in the left-and-right direction on the upper edge of the outer wall section 154c. Plural abutment plates 154a, 154a, . . . are secured, such as by welding, to the bottom plate 151 for covering up the lower surface of the receiving portions 154, 154, . . . .

The upper lid 160 is made up by a rectangular-shaped top plate 161, side plates 162, 162 and end plates 163, 163, depending from the four sides of the top plate 161. These plates 162, 162, 163, 163 are formed unitarily in continuation to one another. In the mid portion of the side plates 162, 162, there are provided engagement pieces 162a, 162a, such as by stamping inwards, with the foremost parts of the engagement pieces being oriented upwards.

Towards both ends and towards both sides of the top plate 161 are formed square tubular shaped receiving portions 164, 164, . . . , such as by stamping downwards. That is, these receiving portions 164 are each formed to delimit a square tube by interconnection of four wall sections 164o, 164i, 164l, 164r. A semi-circular cut-out 164c (see FIG. 13) is formed at a mid portion in the left-and-right direction on the lower edge of the outer wall section 164o. The abutment plates 164a, 164a, . . . are secured to the top plate 161, such as by welding, for overlying the upper sides of the receiving portions 164, 164, . . . .

The hard disc drive 110, supporting the elastic members 140, 140, . . . as described above, are housed and carried within the accommodating casing 120, substantially as follows:

The upper lid 160 is first placed on the bottom plate 150, so that substantially the lower half portions of the elastic members 140, 140, . . . are accommodated in the receiving portions 154, 154 . . . of the bottom box 150 and so that substantially the upper half portions of the elastic members 140, 140, . . . are accommodated in the receiving portions 164, 164, . . . of the upper lid 160. The end plates 153, 153, 163, 163 are secured by set screws 121, 121, . . . to form the accommodating casing 120. Meanwhile, when the upper lid 160 is placed on the bottom plate 150, the engaging pieces 162a, 162a provided to the side plates 162, 162 of the upper lid 160 are engaged in engagement openings 152a, 152a formed in the side plates 152, 152 of the bottom box 150 to prevent the mid portion of the upper lid 160 from being floated from the bottom box 150.

In the above-described buffering mechanism 100, the abutment plates 154a, 164a, and the wall sections 154i, 154r, 164l, 164r, provided to the accommodating casing 120, are abutted against the outer peripheral surface of the elastic member 140, from the up-and-down direction and the left-and-right direction (the direction substantially perpendicular to the direction of extension of the shaft unit 130), while the wall sections 154c, 164c, provided to the accommodating casing 120, are abutted against the outwardly directed lateral surface 144 of the elastic member 140. On the other hand, the wall sections 154i, 164i of the accommodating casing 120 are abutted against the inwardly directed lateral surface 145 of the elastic member 140, that is, the wall sections 154o, 164o, 154i, 164i are abutted against the elastic member 140 in a manner of clinching the elastic member 140 from the direction of extension of the shaft unit 130. Thus, by the elastic member 140 abutting against the abutment plates or the wall sections provided to the accommodating casing 120, the hard disc drive 110 is held within the accommodating casing 120, whilst the vibrations or impacts applied from outside the accommodating casing 120 may be buffered.

FIGS. 17 to 21 show a second embodiment of the buffering mechanism according to the present invention.

A buffering mechanism 200 of the present second embodiment differs from the buffering mechanism 100 of the first embodiment as to the structure supporting the elastic member attached to the object to be housed. However, since the object to be housed (hard disc drive) 110 (inclusive of the shaft unit 130) and the elastic member 140 are the same as those of the first embodiment. Thus, these components are depicted by the same reference numerals as those of the first embodiment and are not explained specifically.

An accommodating casing 210 (housing member) 210, accommodating an object 110, such as a hard disc drive, is made up by a flat bottom box 220 having an open side and an upper lid 230 covering the upper side of the bottom box 220. The bottom box 220 and the upper lid 230 are each formed by machining a metal plate.

The bottom plate 220 is made up by a rectangular-shaped bottom plate 221 and lateral plates 222, 222 and end plates 223, 223 upstanding from the four sides of the bottom plate 221. These plates 222, 222, 223, 223 are formed unitarily in continuation to one another. The mid portions of the side plates 222, 222 are provided with engagement holes 222a, 222a.

The upper lid 230 is made up by a rectangular-shaped top plate 231 and lateral plates 232, 232 and end plates 233, 233 upstanding from the four sides of the top plate 231. These plates 232, 232, 233, 233 are formed unitarily in continuation to one another. The mid portions of the side plates 232, 232 are provided with engagement pieces 232a, 232a inwardly stamped out and which have the foremost parts bent upwards.

Towards both ends of the bottom plate 221 of the bottom box 220, there are secured receiving metal fixtures 240, 240, such as by screwing or welding. The receiving metal fixture 240 is a metal plate formed as one with a base 241 elongated in the left-and-right direction, upstanding wall sections 242, 242 provided towards left and right ends of the base 241 and abutment plates 243u, 243u, 243l, 243l, 243r and 243r provided to the upstanding wall sections 242, 242. The upstanding wall sections 242, 242 are each formed by partially cutting the base 241 and uplifting the so cut portion, so that a rectangular-shaped cutout 241a is formed in a portion of the base 241 below the upstanding wall section. The upstanding wall section 242 is substantially rectangular-shaped and the abutment plates 243u, 243l and 243r are protruded from the upper edge and left and right side edges of the upstanding wall section 242 towards the cut-out 241a. An opening 242a is formed at a mid portion of an area of the upstanding wall section 242 surrounded by the abutment plates 243u, 243l and 243r.

The receiving metal fixtures 240, 240 are secured to both ends of the bottom plate 221 of the bottom box 220 in an orientation in which the abutment plates 243, 243, . . . face each other.

The elastic members 140, carried by the hard disc drive 110, are positioned at an area of the receiving metal fixture 240 surrounded by the abutment plates 243u, 243l and 243r and the bottom plate 221 of the bottom box 220, with the outwardly directed lateral side 144 abutting against the upstanding wall section 242 and with the outer peripheral surface 143 abutting against the abutment plates 243u, 243l and 243r and the bottom plate 221 via the cut-out 241a in the base 242. In this manner, the hard disc drive 110 is supported by the bottom box 220 via the elastic members 140, 140 . . . .

The upper lid 230 then is placed on the bottom box 220. The end plates 223, 223, 233, 233 are secured with set screws 211, 211, . . . to form the accommodating casing 210. Meanwhile, when the upper lid 230 is placed on the bottom plate 220, the engaging pieces 232a, 232a provided to the side plates 232, 232 of the upper lid 230 are engaged in the engagement holes 222a, 222a formed in the side plates 222, 222 of the bottom box 220 to prevent the mid portion of the upper lid 230 from being floated from the bottom box 220.

Meanwhile, in the present second embodiment, in contradistinction from the first embodiment, the upper lid 230 is not provided with portions directly or indirectly contacting with the elastic member 140. Thus, if it is unnecessary to cover up the object 110, the upper lid 230 is not needed.

In the foregoing description, the receiving metal fixture 240 is secured to the bottom plate 221 of the bottom box 220. This receiving metal fixture may, however, be secured to the upper lid 230. If the receiving metal fixture is secured to the bottom box 220, it may be secured to the end plate 223 or to the side plate 222, instead of to the bottom plate 221. Meanwhile, in case the receiving metal fixture 240 is mounted to the end plate 223 of the bottom box 220, the receiving metal fixture may be secured to the casing 210 by co-tightening by the ser screw 211 when the upper lid 230 is mounted by the set screw 211 to the bottom box 220.

With the buffering mechanism 200 of the present second embodiment, the same efficacy as that of the above-described buffering mechanism 100 of the first embodiment may be achieved.

The shape or the structure of various parts of the above-described embodiments merely illustrate examples of execution of the present invention and are not intended to limit the technical scope of the invention which is to be construed only in the light of the claims.

What is claimed is:

1. A buffering mechanism comprising:
  a housing member for housing an object;

at least three shaft units mounted to said object and extending in a direction substantially perpendicular to the direction of thickness of said object; and an elastic member formed of an elastic material and provided with a shaft accommodating opening, wherein one shaft unit is introduced into said shaft accommodating opening of said elastic member, at least a portion of the outer lateral surface of said elastic member is received by a rectangular aperture of said housing member, and the outer shape of said elastic member is substantially cylindrically-shaped.

2. The buffering mechanism according to claim 1 wherein said shaft accommodating opening is cylindrically-shaped.

3. The buffering mechanism according to claim 1 wherein said object contains a recording medium.

4. The buffering mechanism according to claim 1 wherein said housing member is contacted with said elastic member as clinching said elastic member from at least two directions, that is, from a direction of extension of said shaft unit and the direction substantially perpendicular thereto.

5. The buffering mechanism according to claim 1 wherein the outer peripheral surface of said elastic member has a convexed shape when seen from the circumferential direction.

6. A recording and/or reproducing apparatus comprising:
a housing member for housing a recording medium;
a recording and/or reproducing unit for recording and/or reproducing the information for said recording medium;
at least three shaft units mounted to a container containing said recording medium and extending in a direction substantially perpendicular to the direction of thickness of said recording medium; and
an elastic member formed of an elastic material and provided with a shaft accommodating opening;
wherein one shaft unit is introduced into said shaft accommodating opening of said elastic member; at least a portion of the outer lateral surface of said elastic member is received by a rectangular aperture of said housing member, and the outer shape of said elastic member is substantially cylindrically-shaped.

7. The recording and/or reproducing apparatus according to claim 6 wherein said shaft accommodating opening of said elastic member is cylindrically-shaped.

8. The recording and/or reproducing apparatus according to claim 6 wherein said housing member is contacted with said elastic member as clinching said elastic member from at least two directions, that is, a from direction of extension of said shaft unit and the direction substantially perpendicular thereto.

9. The recording and/or reproducing apparatus according to claim 6 wherein the outer peripheral surface of said elastic member has a convex shape when seen from the circumferential direction.

10. A buffering mechanism comprising:
a housing member for housing an object;
at least three shaft means for mounting to said object and extending in a direction substantially perpendicular to the direction of thickness of said object; and
an elastic means for buffering formed of an elastic material and provided with a shaft accommodating opening,
wherein one shaft means is introduced into said shaft accommodating opening of said elastic means for buffering, at least a portion of the outer lateral surface of said elastic means for buffering is received by a rectangular aperture of said housing member, and wherein the outer shape of said elastic means is substantially cylindrically-shaped.

11. The buffering mechanism according to claim 10 wherein said object contains a recording medium.

12. The buffering mechanism according to claim 10 wherein said housing member is contacted with said elastic means for buffering as clinching said elastic means for buffering from at least two directions, that is, from a direction of extension of said shaft unit and the direction substantially perpendicular thereto.

13. The buffering mechanism according to claim 10 wherein the outer peripheral surface of said elastic means for buffering has a convex shape when seen from the circumferential direction.

14. The buffering mechanism according to claim 10 wherein said shaft accommodating opening is cylindrically-shaped.

* * * * *

UNITED STATES PATENT AND TRADEMARK OFFICE
CERTIFICATE OF CORRECTION

| | |
|---|---|
| PATENT NO. | : 7,209,318 B2 |
| APPLICATION NO. | : 10/767333 |
| DATED | : April 24, 2007 |
| INVENTOR(S) | : Masanori Ogata et al. |

It is certified that error appears in the above-identified patent and that said Letters Patent is hereby corrected as shown below:

Column 1, line 63, change "land" to --1 and--.

Column 3, line 41, change "therefor" to --therefore--.

Column 10, line 41, change "fro" to --for--.

Column 13, line 9, change "154i" to --1541--.

Column 14, line 53, change "ser" to --set--.

Column 15, line 23, Claim 5 change "convexed" to --convex--.

Column 15, line 37, Claim 6 change ";" to --,--.

Signed and Sealed this

Eleventh Day of September, 2007

JON W. DUDAS
*Director of the United States Patent and Trademark Office*